(12) United States Patent
Tsai et al.

(10) Patent No.: US 12,395,292 B2
(45) Date of Patent: Aug. 19, 2025

(54) METHOD FOR MONITORING TRACKING REFERENCE SIGNAL AND RELATED DEVICE

(71) Applicant: SHARP KABUSHIKI KAISHA, Sakai (JP)

(72) Inventors: Hsin-Hsi Tsai, Taipei (TW); Mei-Ju Shih, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 308 days.

(21) Appl. No.: 17/880,038

(22) Filed: Aug. 3, 2022

(65) Prior Publication Data

US 2023/0051117 A1 Feb. 16, 2023

Related U.S. Application Data

(60) Provisional application No. 63/203,974, filed on Aug. 5, 2021, provisional application No. 63/228,986, filed on Aug. 3, 2021.

(51) Int. Cl.
*H04L 5/00* (2006.01)

(52) U.S. Cl.
CPC .................. *H04L 5/0048* (2013.01)

(58) Field of Classification Search
CPC ..... H04L 5/0048; H04L 5/0053; H04L 5/005; H04L 5/0051; H04L 5/0094; H04W 72/04; H04W 72/0446; H04W 72/232; H04B 7/06
See application file for complete search history.

(56) References Cited

U.S. PATENT DOCUMENTS

| | | | |
|---|---|---|---|
| 11,895,664 B2* | 2/2024 | Xu | H04W 72/23 |
| 2024/0129817 A1* | 4/2024 | Nagano | H04W 72/12 |
| 2024/0137909 A1* | 4/2024 | Liu | H04W 68/005 |
| 2024/0154757 A1* | 5/2024 | Nagano | H04L 5/0053 |
| 2024/0289627 A1* | 8/2024 | Tan | H04L 1/0003 |

(Continued)

FOREIGN PATENT DOCUMENTS

| | | | | |
|---|---|---|---|---|
| CN | 112771912 A | 5/2021 | | |
| CN | 115119290 A | 9/2022 | | |
| EP | 4228351 A1 * | 8/2023 | ........ | H04W 52/0216 |

(Continued)

OTHER PUBLICATIONS

Ericsson, "Provisioning of TRS occasions to Idle/Inactive UEs", 3GPP TSG RAN WG1 #105-e e-Meeting, May 10-May 27, 2021, R1-2105792, Sections 2-3.

(Continued)

*Primary Examiner* — Mohamed A Kamara
(74) *Attorney, Agent, or Firm* — ScienBiziP, P.C.

(57) ABSTRACT

A method for a user equipment (UE) of determining a tracking reference signal (TRS) resource set availability is provided. The method includes receiving, from a base station (BS), a TRS configuration that indicates one or more TRS resource sets for the UE to monitor reference signals; determining whether a Layer 1 (L1)-based availability indication for the one or more TRS resource sets is received from the BS; and determining the one or more TRS resource sets are unavailable when the UE determines that the L1-based availability indication has not been received from the BS.

16 Claims, 12 Drawing Sheets

(56) References Cited

U.S. PATENT DOCUMENTS

2024/0313911 A1* 9/2024 Nimbalker .......... H04W 72/232

FOREIGN PATENT DOCUMENTS

| WO | 2021146608 A1 | 7/2021 |
| WO | 2023153312 A1 | 8/2023 |

OTHER PUBLICATIONS

3GPP TS 37.355, "3rd Generation Partnership Project; Technical Specification Group Radio Access Network; LTE Positioning Protocol (LPP) (Release 17)", V17.1.0 (Jun. 2022).

3GPP TS 36.304, "3rd Generation Partnership Project; Technical Specification Group Radio Access Network; Evolved Universal Terrestrial Radio Access (E-UTRA); User Equipment (UE) procedures in idle mode (Release 17)", V17.1.0 (Jun. 2022).

ZTE, Sanechips, "TRS for RRC idle and inactive UEs", 3GPP TSG RAN WG1 #105-e e-Meeting, May 10-27, 2021, R1-2104222, Section 2.

MediaTek Inc., "On TRS/CSI-RS occasion(s) for idle/inactive mode UE power saving", 3GPP TSG RAN WG1 #105-e e-Meeting, May 10-27, 2021, R1-2105387, Sections 2-3.

3GPP TS 38.300 V16.6.0 (Jun. 2021), 3rd Generation Partnership Project; Technical Specification Group Radio Access Network; NR; NR and NG-RAN Overall Description; Stage 2 (Release 16).

3GPP TS 38.331 V16.5.0 (Jun. 2021), 3rd Generation Partnership Project; Technical Specification Group Radio Access Network; NR; Radio Resource Control (RRC) protocol specification (Release 16).

3GPP TS 38.212 V16.6.0 (Jun. 2021), 3rd Generation Partnership Project; Technical Specification Group Radio Access Network; NR; Multiplexing and channel coding (Release 16).

3GPP TS 38.213 V16.6.0 (Jun. 2021), 3rd Generation Partnership Project; Technical Specification Group Radio Access Network; NR; Physical layer procedures for control (Release 16).

3GPP TS 38.304 V16.5.0 (Jun. 2021), 3rd Generation Partnership Project; Technical Specification Group Radio Access Network; NR; User Equipment (UE) procedures in Idle mode and RRC Inactive state (Release 16).

3GPP TS 38.214 V16.6.0 (Jun. 2021), 3rd Generation Partnership Project; Technical Specification Group Radio Access Network; NR; Physical layer procedures for data (Release 16).

Lenovo, Motorola Mobility: "Provision of TRS/CSI-RS for idle/inactive UEs", R1-2105771, 3GPP TSG RAN WG1 Meeting #105 e-Meeting, May 10-27, 2021.

CATT: "Configuration of TRS/CSI-RS for paging enhancement", R1-2104533, 3GPP TSG RAN WG1 #105-e, e-Meeting, May 19-27, 2021.

* cited by examiner

METHOD FOR MONITORING TRACKING REFERENCE SIGNAL AND RELATED DEVICE

CROSS-REFERENCE TO RELATED APPLICATION(S)

The present disclosure claims the benefit of and priority to U.S. Provisional Patent Application Ser. No. 63/228,986, filed on Aug. 3, 2021, entitled "PAGING EARLY INDICATION," and U.S. Provisional Patent Application Ser. No. 63/203,974, filed on Aug. 5, 2021, entitled "TRACKING REFERENCE SIGNAL IN IDLE AND INACTIVE," the contents of all of which are hereby incorporated herein fully by reference into the present disclosure.

FIELD

The present disclosure is generally related to wireless communications and, more specifically, to a method for monitoring a tracking reference signal and a related device configured to employ the method.

BACKGROUND

With the tremendous growth in the number of connected devices and the rapid increase in user/network traffic volume, various efforts have been made to improve different aspects of wireless communication for next-generation wireless communication systems, such as the fifth-generation (5G) New Radio (NR) system, by improving data rate, latency, reliability, and mobility.

The 5G NR system is designed to provide flexibility and configurability for optimizing network services and types, and accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication in next-generation wireless communication systems.

SUMMARY

The present disclosure provides a method and a related device for monitoring a tracking reference signal (TRS).

According to an aspect of the present disclosure, a method for a user equipment (UE) for monitoring a tracking reference signal (TRS) is provided. The method includes receiving, from a base station (BS), a TRS configuration that indicates one or more TRS resource sets for the UE to monitor reference signals; determining whether a Layer 1 (L1)-based availability indication for the one or more TRS resource sets is received from the BS; and determining the one or more TRS resource sets are unavailable when the UE determines that the L1-based availability indication has not been received from the BS.

According to another aspect of the present disclosure, a UE for monitoring a tracking reference signal (TRS) is provided. The UE includes at least one processor, and at least one memory coupled to the at least one processor and storing computer-executable instructions that, when executed by the at least one processor, cause the UE to perform the above-disclosed method of monitoring the TRS.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
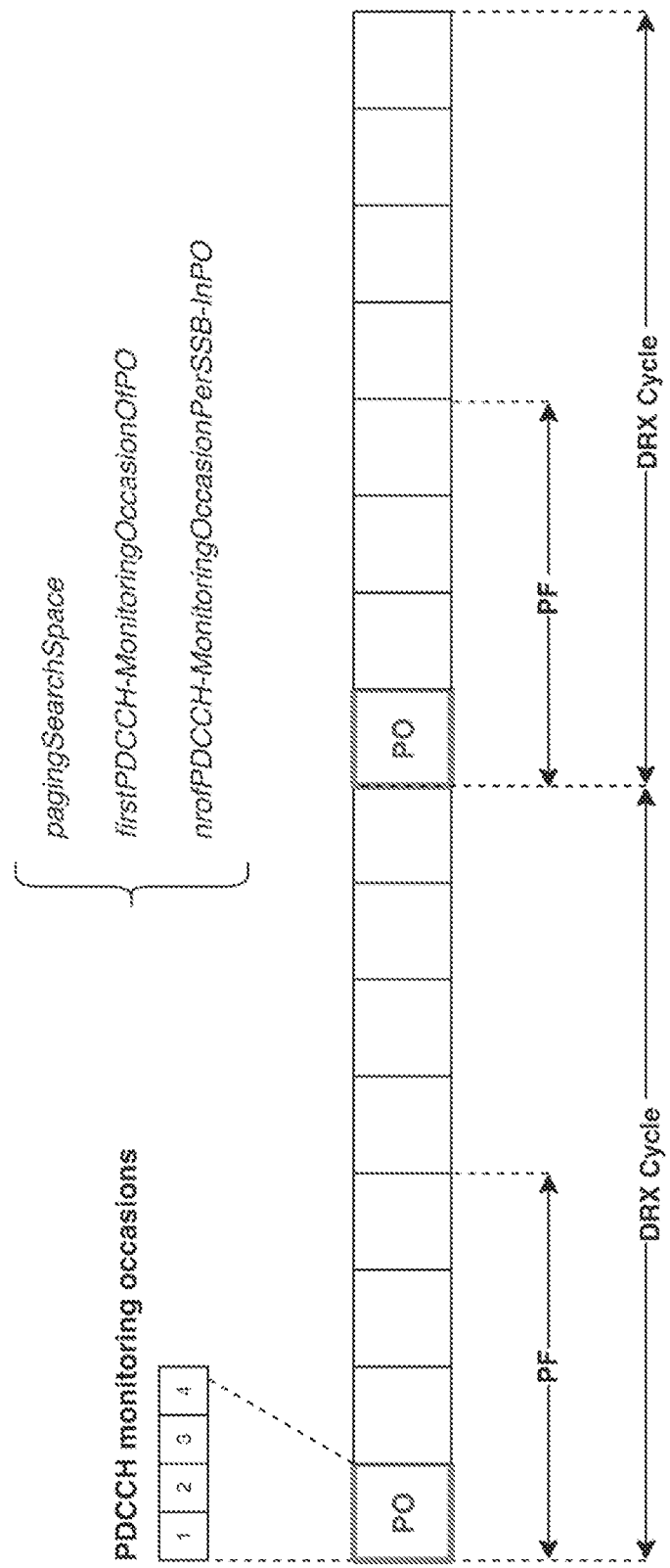
FIG. 1 is a timing diagram illustrating a Discontinuous Reception (DRX) mechanism for paging monitoring, according to an implementation of the present disclosure.

Abbreviations used in this disclosure may include the following:

| Abbreviation | Full name |
| --- | --- |
| ACK | Acknowledge |
| AGC | Automatic Gain Control |
| AS | Access Stratum |
| BA | Bandwidth Adaptation |
| BCCH | Broadcast Control Channel |
| BS | Base Station |
| BSR | Buffer Status Report |
| BWP | Bandwidth Part |
| CBRA | Contention Based Random Access |
| CCCH | Common Control Channel |
| CCE | Control Channel Element |
| CE | Control Element |
| CFRA | Contention Free Random Access |
| CG | Configured Grant |
| CMAS | Commercial Mobile Alert System |
| CORESET | Control Resource Set |
| C-RNTI | Cell-Radio Network Temporary Identifier |
| CRS | Cell-specific Reference Signal |

| Abbreviation | Full name |
| --- | --- |
| CSI | Channel State Information |
| CS-RNTI | Configured Scheduling RNTI |
| CSS | Common Search Space |
| DCI | Downlink Control Information |
| DFI | Downlink Feedback Information |
| DG | Dynamic Grant |
| DL | Downlink |
| DMRS | Demodulation Reference Signal |
| DRB | Data Radio Bearer |
| DRX | Discontinuous Reception |
| eNB | Evolved Node B |
| ETWS | Earthquake and Tsunami Warning System |
| E-UTRA | Evolved Universal Terrestrial Radio Access |
| FR | Frequency Range |
| gNB | Next Generation Node B |
| HARQ | Hybrid Automatic Repeat reQuest |
| IE | Information Element |
| L1 | (Physical) Layer 1 |
| LCH | Logical Channel |
| LCP | Logical Channel Prioritization |
| MAC | Medium Access Control |
| MCG | Master Cell Group |
| MCS | Modulation and Coding Scheme |
| MPE | Maximum Permissible Exposure |
| Msg | Message |
| NACK | Non-Acknowledge |
| NAS | Non-Access Stratum |
| NR | New Radio |
| NW | Network |
| NUL | Normal Uplink |
| PBCH | Physical Broadcast Channel |
| PCell | Primary Cell |
| PDCP | Packet Data Convergence Protocol |
| PDCCH | Physical Downlink Control Channel |
| PDSCH | Physical Downlink Shared Channel |
| PDU | Protocol Data Unit |
| PEI | Paging Early Indication |
| PF | Paging Frame |
| PO | Paging Occasion |
| PHY | Physical Layer |
| PRACH | Physical Random Access Channel |
| PRB | Physical Resource Block |
| P-RNTI | Paging-RNTI |
| PSCell | Primary Secondary Cell |
| PUCCH | Physical Uplink Control Channel |
| PUSCH | Physical Uplink Shared Channel |
| PWS | Public Warning System |
| QCL | Quasi Co Location |
| RA | Random Access |
| RACH | Random Access Channel |
| RAR | Random Access Response |
| Rel | Release |
| RLC | Radio Link Control |
| RNA | RAN Notification Area |
| RMSI | Remaining Minimum System Information |
| RNTI | Radio Network Temporary Identifier |
| RO | RACH Occasion |
| RRC | Radio Resource Control |
| RRM | Radio Resource Management |
| RS | Reference Signal |
| RSRP | Reference Signal Received Power |
| Rx | Reception |
| SCell | Secondary Cell |
| SCG | SCG |
| SCS | Subcarrier Spacing |
| SDAP | Service Data Application Protocol |
| SDT | Small Data Transmission |
| SDU | Service Data Unit |
| SFN | System Frame Number |
| SI | System Information |
| SIB | System Information Block |
| SPS | Semi-Persistent Scheduling |
| SpCell | Special Cell |
| SRB | Signaling Radio Bearer |
| SR | Scheduling Request |
| SRS | Sounding Reference Signal |
| SS | Search Space |
| SSB | SS/PBCH Block |
| SSB | Synchronization Signal Block |
| SS-RSRP | Synchronization Signal-RSRP |
| SUL | Supplementary Uplink |
| TA | Timing Alignment or Time Advance |
| TB | Transport Block |
| TAT | Timing Alignment Timer |
| TCI | Transmission Configuration Indicator |
| TRP | Transmission Reception Point |
| TRS | Tracking Reference Signal |
| TS | Technical Specification |
| Tx | Transmission |
| TBS | Transport Block Size |
| TRP | Transmission and Reception Point |
| TRS | Tracking Reference Signal |
| UCI | Uplink Control Information |
| UE | User Equipment |
| UL | Uplink |
| USS | UE-specific Search Space |
| VRB | Virtual Resource Block |

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is illustrated in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists, A and B exist at the same time, A and C exist at the same time, B and C exist at the same time, and A, B and C exist at the same time. Further, the character "/" used herein generally represents that the former and latter associated objects are in an "or" relationship.

A UE may be referred to as PHY/MAC/RLC/PDCP/SDAP/RRC/AS/NAS layer/entity. The PHY/MAC/RLC/PDCP/SDAP/RRC/AS/NAS layer/entity may be referred to as the UE.

A NW may be a network node, a TRP, a cell (e.g., SpCell, PCell, PSCell, and/or SCell), an eNB, a gNB, and/or a base station.

Serving Cell: A PCell, a PSCell, or an SCell (Secondary Cell). The serving cell may be an activated or a deactivated serving cell.

SpCell: For Dual Connectivity operation, the term Special Cell refers to the PCell of the MCG or the PSCell of the SCG depending on if the MAC entity is associated to the MCG or the SCG, respectively. Otherwise, the term Special Cell refers to the PCell.

The terms "initiate", "trigger", "apply", "store", and "start" may be interchangeably used in some implementations of the present disclosure.

The terms "terminate", "stop", "release", "suspend", "discard", "end", "complete", "abort", and "cancel" may be interchangeably used in some implementations of the present disclosure.

The terms "period", "process", "phase", and "duration" may be interchangeably used in some implementations of the present disclosure.

The terms "resource" and "occasion" may be interchangeably used in some implementations of the present disclosure.

The terms "ongoing", "running", and "pending" may be interchangeably used in some implementations of the present disclosure.

The terms "mechanism", "scheme", and "functionality" may be interchangeably used in some implementations of the present disclosure.

The terms "mapped to" and "associated with" may be interchangeably used in some implementations of the present disclosure.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behavior, term, or claim in the present disclosure may be implemented independently and separately to form a specific method. Dependency, e.g., "based on", "more specifically", "preferably", "in one embodiment", "in one implementation", "in one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may include computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or one or more Digital Signal Processors (DSPs). Although some of the disclosed implementations are directed to software installed and executing on computer hardware, nevertheless, alternative implementations as firmware, as hardware, or as a combination of hardware and software are well within the scope of the present disclosure.

The computer-readable medium may include, but may not be limited to, Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

A UE, according to the present disclosure, may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to one or more UEs within its radio coverage (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are applicable in NR: (1) low-density parity-check (LDPC) code and (2) polar code. The coding scheme adaptation may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

UE Power in RRC_INACTIVE/RRC_IDLE State

A UE may wake up in advance before a configured Paging Occasion (PO), and perform the following steps:

Step 1: A UE sets up the wakeup time before a PO based on the expected preparation time of a paging Downlink Control Information (DCI) and paging message decoding since the UE does not know the exact camping cell and received signal quality of the Physical Downlink Control Channel (PDCCH) and Physical Downlink Shared Channel (PDSCH) after the UE transits to the wakeup time from a deep sleep mode. During the sleep mode, most of the UE components were shut down and the local oscillator of the UE is in free running mode. During the preparation period before a PO, the UE tunes all components of the front-end processors of the UE in preparation for data reception (e.g., warm up time). The preparation period is used to accommodate all processing requirements.

Step 2: Timing acquisition from a Search Space (SS)/ Physical broadcast channel (PBCH) Block (SSB) and coarse synchronization—the UE may be out-of-sync from the network after the sleep mode (e.g., no synchronization after 160-320 milliseconds (ms)). The local oscillator of the UE is in free running mode without the calibration of frequency stability from downlink (DL) received signals. The UE uses the timing reference generated from the local oscillator for cell search and timing acquisition. The UE may use the first detected SSB for the initial timing acquisition and Automatic Gain Control (AGC) tuning after the sleep mode through the peak detection of the Primary Synchronization Signal (PSS)/Secondary Synchronization Signal (SSS).

Step 3: Frequency and time tracking after coarse synchronization—After coarse synchronization, the UE starts the front-end algorithm for a frequency and time offset estimation.

Step 4: Calibration of the local oscillator—the reference timing clock from the local oscillator needs to be calibrated by the received signals with time and frequency offset fine tuning to correct the frequency drift of the local oscillator in achieving 0.1 parts per million (ppm) frequency stability requirements. The UE needs to use additional SSBs with frequency and timing offset fine tuning in order to achieve the calibration of the local oscillator.

Step 5: Time and frequency offset compensation of receiving signals.

Step 6: Demodulating/decoding the paging DCI from PDCCH for paging indication.

Step 7: Demodulating/decoding PDSCH and retrieve the paging information.

Step 8: If a UE_ID is included in the paging message, the UE performs subsequent processing, such as contention-based Physical Random Access Channel (PRACH). Otherwise, the UE goes back to a sleep mode.

Paging

To reduce power consumption in RRC_IDLE/RRC_INACTIVE state, the UE may apply a Discontinuous Reception (DRX) mechanism for paging (DCI) monitoring, which may imply that the UE in RRC_IDLE/RRC_INACTIVE state may not need to monitor the PDCCH continuously. FIG. 1 is a timing diagram illustrating a DRX mechanism for paging monitoring, according to an implementation of the present disclosure. As shown in FIG. 1, a UE may be configured with DRX cycle(s) and several parameters for the determination of a PO. It should be noted that the UE may only monitor one PO per DRX cycle. In some cases (e.g., multi-beam operation, operation with shared spectrum channel access), the UE may monitor multiple PDCCH monitoring occasions in one PO. In addition, a PO may include a set of 'S' consecutive PDCCH monitoring occasions, where 'S' may be the number of actual transmitted SSBs determined according to ssb-PositionsInBurst configured in system information block 1 (SIB1).

Figure 2:
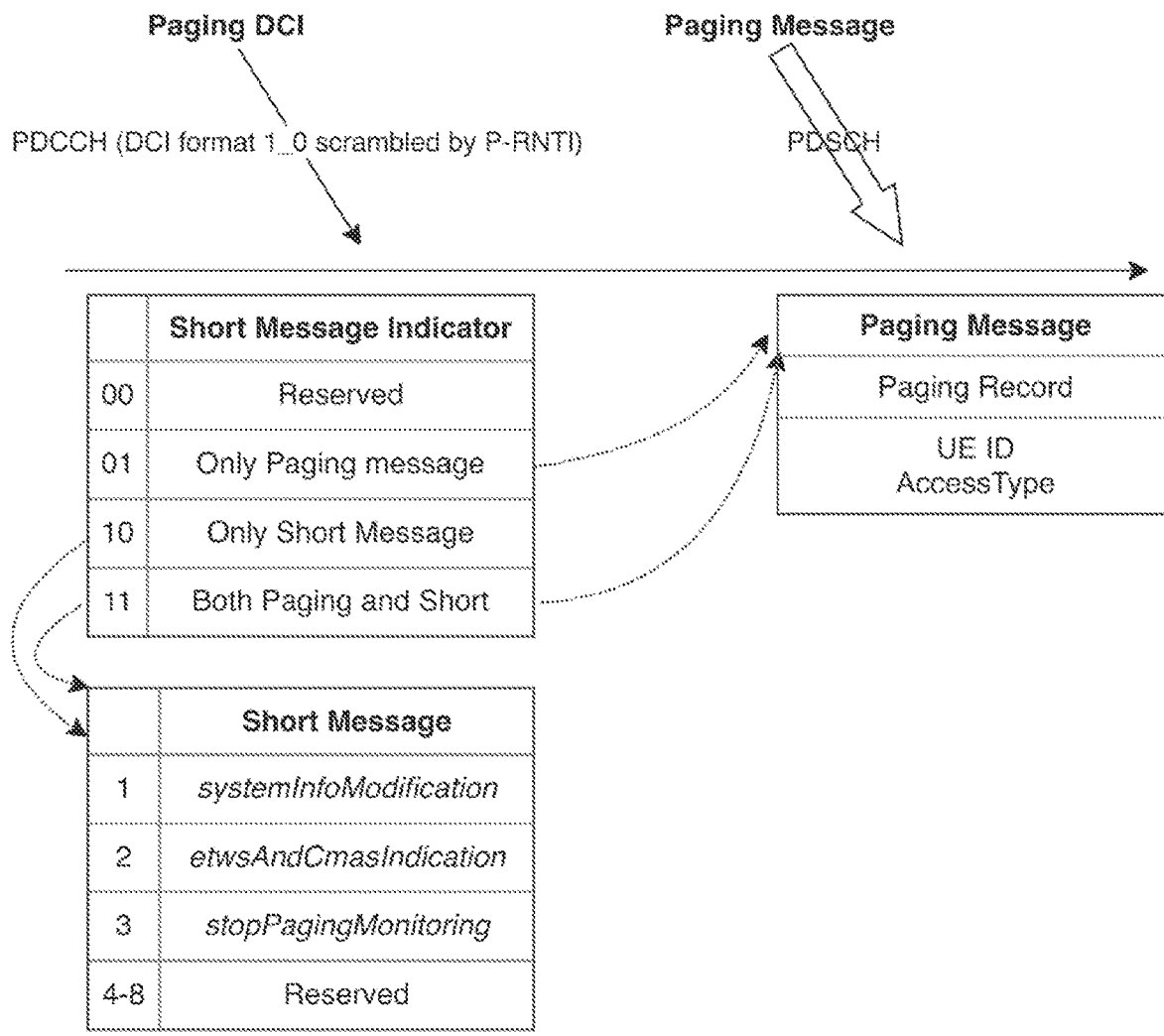
FIG. 2 is a timing diagram illustrating paging Downlink Control Information (DCI), a short message, and a paging message, according to an implementation of the present disclosure.

Paging allows a network (NW) to communicate with UEs via a paging message (e.g., a Radio Resource Control (RRC) message transmitted by PDSCH/PCCH) and notify UEs of a system information modification indication and/or an Earthquake and Tsunami Warning System (ETWS)/Commercial Mobile Alert System (CMAS) indication through a short message (e.g., included in a Short Message field in DCI format 1_0). FIG. 2 is a timing diagram illustrating a paging DCI, a short message, and a paging message, according to an implementation of the present disclosure. As shown in FIG. 2, a UE may monitor the PDCCH to receive a Paging DCI (e.g., transmitted by a DCI format 1_0 with cyclic redundancy check (CRC) scrambled by a Paging-Radio Network Temporary Identifier (P-RNTI)). When the UE receives the paging DCI, the UE checks a short message indicator field in the paging DCI to determine whether a short message is included in the paging DCI and determine whether scheduling information for the paging message is presented. If the short message indicator indicates a scheduling information for a paging message (e.g., bit field is '01' or '11'), the UE may further receive the paging message on the PDSCH based on the scheduling information indicated by the paging DCI. When the UE in RRC_IDLE/RRC_I-

NACTIVE state receives the paging message, the UE may perform the following actions:

When the UE receives a paging message, the UE may:

---

1> if the UE is in RRC IDLE state, for each PagingRecord included in the Paging message:
    2> if the ue-Identity included in the PagingRecord matches the UE identity allocated by upper layers (e.g., Non-Access Stratum (NAS) layer):
        3> the UE forwards the ue-Identity and accessType (if present) to an upper layer of the UE;
1> if the UE is in RRC_INACTIVE state, for each PagingRecord included in the Paging message:
    2> if the ue-Identity included in the PagingRecord matches the UE's stored fulII-RNTI:
        3> if the UE is configured by an upper layer with Access Identity 1:
            4> the UE initiates the RRC connection resumption procedure with resumeCause set to mps-PriorityAccess;
        3> else if the UE is configured by an upper layer of the UE with Access Identity 2:
            4> the UE initiates the RRC connection resumption procedure with resumeCause set to mcs-PriorityAccess;
        3> else if the UE is configured by an upper layer of the UE with one
or more Access Identities equal to 11-15:
            4> the UE initiates the RRC connection resumption procedure with resumeCause set to highPriorityAccess;
        3> else:
            4> the UE initiates the RRC connection resumption procedure with resumeCause set to mt-Access;
    2> else if the ue-Identity included in the PagingRecord matches the UE identity allocated by an upper layer of the UE:
        3> the UE forwards the ue-Identity to an upper layer of the UE and
accessType (if present) to the upper layer;
        3> the UE performs the actions based on 3GPP TS 38.331 upon going to RRC IDLE state with release cause 'other'.

---

System Information (SI) and ETWS/CMAS

SI Modification

System information modification/change (other than for ETWS/CMAS) may occur at specific radio frames (e.g., the concept of a modification period may be used). System information may be transmitted a number of times with the same content within a modification period. The modification period may be configured by system information.

When the network changes/modifies (some of the) system information, the network first notifies the UEs about this modification (e.g., in a modification period). In the next modification period, the network transmits the updated system information. When receiving an SI modification notification (e.g., via short message in paging DCI), the UE may attempt to acquire the new system information from the start of the next modification period. The UE may apply the previously acquired system information until the UE acquires the new system information.

Public Warning System

NR connected to 5GC may provide support for public warning systems (PWSs) by system information broadcast capability. NR is responsible for scheduling and broadcasting of the warning messages as well as for paging the UE to provide an indication that the warning message is broadcast:

ETWS is a public warning system developed to meet the regulatory requirements for warning notifications related to earthquake and/or tsunami events. ETWS warning notifications can either be a primary notification (e.g., short notification) or secondary notification.

CMAS is a public warning system developed for the delivery of multiple warning notifications.

Different SIBs are defined for ETWS primary notification, ETWS secondary notification, and CMAS notification. Paging (e.g., short message in paging DCI) is used to inform UEs about ETWS indication and CMAS indication. A UE monitors for an ETWS/CMAS indication in a PO when the UE is in RRC_IDLE/RRC_INACTIVE state. A UE monitors for an ETWS/CMAS indication in any PO when the UE is in RRC_CONNECTED state. Paging (e.g., short message in paging DCI) indicating an ETWS/CMAS notification triggers acquisition of system information.

Modification Period

A modification period may be used (e.g., an updated SI message (other than SI message for ETWS, CMAS, and positioning assistance data) is broadcast in the modification period following the one where the SI modification indication is transmitted). The modification period boundaries are defined by System Frame Number (SFN) values for which SFN mod m=0, where m is the number of radio frames including the modification period. The modification period is configured by system information. The UE receives indications about SI modifications and/or PWS notifications via a short message transmitted by paging DCI (with P-RNTI). Repetitions of SI change indication may occur within a preceding modification period.

UEs in RRC_IDLE/RRC_INACTIVE state may monitor for an SI modification indication in a PO every DRX cycle. UEs in RRC_CONNECTED state may monitor for an SI modification indication in any PO at least once per modification period when the UE is provided with a common search space (e.g., including pagingSearchSpace, searchSpaceSIB1, and/or searchSpaceOtherSystemInformation) on the active Bandwidth Part (BWP) to monitor paging.

ETWS/CMAS-capable UEs in RRC_IDLE/RRC_INACTIVE state may monitor paging DCI (including a short message) for indicating an ETWS/CMAS notification in a PO every DRX cycle. ETWS/CMAS-capable UEs in RRC_CONNECTED state may monitor paging DCI (including a short message) for indicating a PWS notification in any PO at least once every defaultPagingCycle when the UE is provided with a common search space (e.g., including pagingSearchSpace, searchSpaceSIB1, and searchSpaceOtherSystemInformation) on the active BWP to monitor a paging DCI.

When the UE receives a short message (included in the paging DCI), the UE may perform the following actions:

---

1> if the UE is ETWS-capable or CMAS-capable, the etwsAndCmasIndication bit of Short Message is set, and the UE is provided with searchSpaceSIB1 and searchSpaceOtherSystemInformation on the active BWP or the initial BWP:
    2> the UE immediately re-acquires the SIB1;
    2> if the UE is ETWS-capable and si-SchedulingInfo includes scheduling information for SIB6:
        3> the UE acquires SIB6 immediately;
    2> if the UE is ETWS-capable and si-SchedulingInfo includes scheduling information for SIB7:
        3> the UE acquires SIB7 immediately;
    2> if the UE is CMAS-capable and si-SchedulingInfo includes scheduling information for SIB8:
        3> the UE acquires SIB8 immediately;

---

It should be noted that, in a case that SIB6, SIB7, or SIB8 overlaps with a measurement gap, the UE may determine to immediately acquire SIB6, SIB7, or SIB8.

1> if the systemInfoModification bit of short message is set:
    2> the UE applies the SI acquisition procedure from the start of the next modification period.

Figure 3:
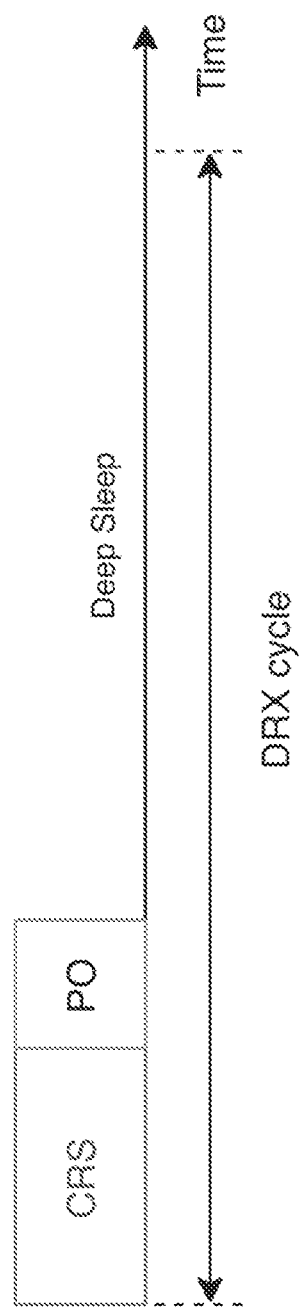
FIG. 3 is a timing diagram illustrating a Cell-specific Reference Signal (CRS) in a DRX cycle, according to an implementation of the present disclosure.
Figure 4:
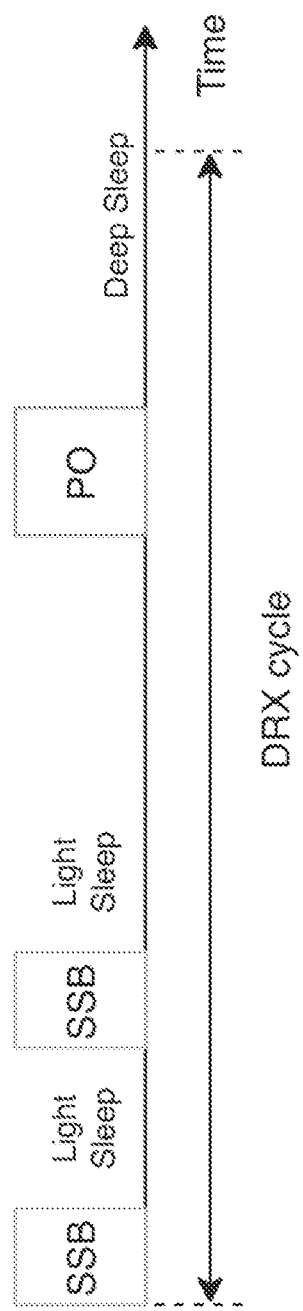
FIG. 4 is a timing diagram illustrating a Search Space (SS)/Physical Broadcast Channel (PBCH) Block (SSB) in a DRX cycle, according to an implementation of the present disclosure.
Figure 5:
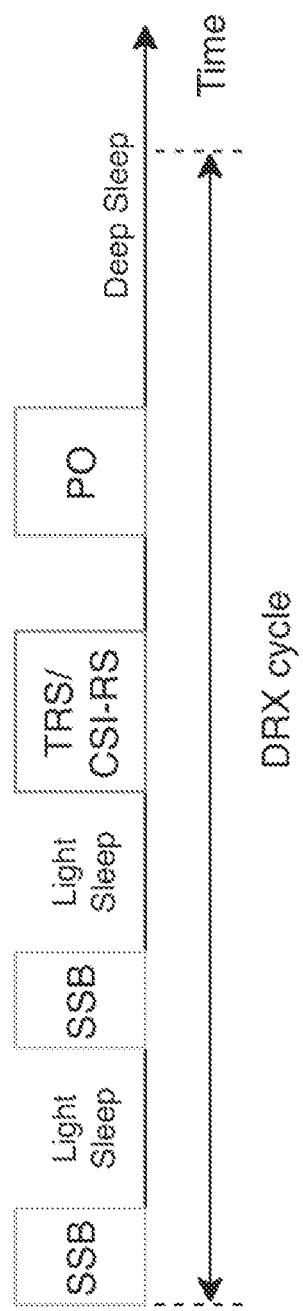
FIG. 5 is a timing diagram illustrating a TRS/Channel State Information-Reference Signal (TRS/CSI-RS) in a DRX cycle, according to an implementation of the present disclosure.

Tracking Reference Signal (TRS)/Channel State Information Reference Signal (CSI-RS) in RRC_IDLE/RRC_INACTIVE State For a UE operating in RRC_IDLE/RRC_INACTIVE state, the UE may consume power for various activities, such as AGC, time/frequency synchronization, RRM measurement, paging monitoring, etc. FIG. 3 is a timing diagram illustrating a Cell-specific Reference Signal (CRS) in a DRX cycle, according to an implementation of the present disclosure. As illustrated in FIG. 3, LTE supports an always-on CRS in every subframe. FIG. 4 is a timing diagram illustrating an SSB in a DRX cycle, according to an implementation of the present disclosure. As illustrated in FIG. 4, NR supports the SSB if the SSB is transmitted with a longer periodicity (e.g., 20 ms) compared to the LTE CRS, as illustrated in FIG. 3. NR UE needs to wake-up much earlier, much longer, and more frequently compared to LTE UE for the subsequent activities. Accordingly, the power consumption for NR UE in RRC_IDLE/RRC_INACTIVE state is much higher than that for LTE UE in RRC_IDLE state. FIG. 5 is a timing diagram illustrating a TRS/CSI-RS in a DRX cycle, according to an implementation of the present disclosure. As illustrated in FIG. 5, TRS/CSI-RS occasion(s) is provided to a UE in RRC_IDLE/RRC_INACTIVE state for UE power saving enhancements.

It should be noted that the TRS/CSI-RS occasion(s) provided to the UE in RRC_IDLE/RRC_INACTIVE state is used to assist time/frequency tracking, potentially RRM measurement, and paging reception indication, as compared to the SSB, so as to reduce the total wake up time.

The TRS/CSI-RS occasion(s) for UEs in RRC_CONNECTED state may be shared with UEs in RRC_IDLE/RRC_INACTIVE state.

In some examples, a gNB may potentially share the TRS/CSI-RS occasions with UEs in RRC_IDLE/RRC_INACTIVE state (e.g., the NW may determine whether to share or not to share).

In some examples, a TRS/CSI-RS in the TRS/CSI-RS occasion(s) may or may not be transmitted.

In some examples, always-on TRS/CSI-RS transmission by the gNB may not be required.

In some examples, the TRS/CSI-RS occasion(s) corresponding to a periodic TRS may be supported.

A UE in RRC_IDLE/RRC_INACTIVE state may use the TRS/CSI-RS occasion(s) for functionalities such as:
  AGC;
  Time/frequency tracking;
  RRM measurement for a serving cell;
  RRM measurement for a neighbor cell; and/or
  Paging reception indication.

An gNB may determine whether to transmit a TRS/CSI-RS to UEs in RRC_IDLE/RRC_INACTIVE state even when the TRS/CSI-RS is not needed by UEs in RRC_CONNECTED state (e.g., when there is a UE in RRC_CONNECTED state in a cell but the UE is no longer using the TRS/CSI-RS, or when there is no longer a UE in RRC_CONNECTED state in a cell).

The configuration of TRS/CSI-RS occasion(s) for UE(s) in RRC_IDLE/RRC_INACTIVE state is provided by higher layer signaling.

In some examples, the higher layer signaling may be SIB, dedicated RRC, RRC release message, etc.

In some examples, the SIB may provide the configuration of TRS/CSI-RS occasion(s) for the UE(s) in RRC_IDLE/RRC_INACTIVE state.

Configuration of TRS/CSI-RS occasion(s) for the UEs in RRC_IDLE/RRC_INACTIVE state may include at least:

powerControlOffsetSS: $\{-3, 0, 3, 6\}$dB;
scramblingID: 0 to 1023;
firstOFDMSymbolInTimeDomain: 0 to 9;
firstOFDMSymbolInTimeDomain indicates a first symbol in a slot, and a second symbol in the same slot can be derived implicitly with symbol index as firstOFDMSymbolInTimeDomain+4;
startingRB: 0 to 274;
nrofRBs: 24 to 276;
periodicityAndOffset $\{10, 20, 40, 80\}$ ms; and
frequencyDomainAllocation for row1 with applicable values from $\{0, 1, 2, 3\}$ to indicate the offset of the first RE to RE #0 in a RB.

The Subcarrier Spacing (SCS) configuration of TRS/CSI-RS occasion(s) for UEs in RRC_IDLE/INACTIVE state may be:
  Alternative 1: same as initial BWP.
  Alternative 2: configurable parameter.

Multiple RS resources may be configured for TRS/CSI-RS occasion(s) for UEs in RRC_IDLE/RRC_INACTIVE state.

The configuration of the frequency location of TRS/CSI-RS occasion(s) for UEs in RRC_IDLE/RRC_INACTIVE state may be:
  Alternative 1: within initial DL BWP.
  Alternative 2: is not restricted by initial BWP.

The Quasi Co-Location (QCL) information of TRS/CSI-RS occasion(s) for UEs in RRC_IDLE/RRC_INACTIVE state may be:
  Alternative 1: From higher layer configuration (e.g., qcl-InfoPeriodicCSI-RS).
  Alternative 2: QCL assumptions associated with transmitted SSBs implicitly (e.g. similar to PDCCH monitoring in PO).

It should be noted that the QCL information of TRS/CSI-RS occasion(s) for UEs in RRC_IDLE/RRC_INACTIVE state may be indicated by an SSB index in the range of 0 to 63.

SCS of TRS/CSI-RS occasion(s) for UEs in RRC_IDLE/RRC_INACTIVE state may be the same as the SCS of a Control Resource Set (e.g., CORESET #0).

Paging DCI and Short Message

Paging DCI (DCI Format 1_0 Scrambled by P-RNTI)

The following information is transmitted by means of the DCI format 1_0 with CRC scrambled by P-RNTI:
  1. Short message indicator is a 2-bit field as shown in Table 1 below. Table 1 illustrates a Short Message indicator.
  2. Short Message—8 bits, according to Clause 6.5 of 3GPP TS 38.331. If the scheduling information for paging is carried in the short message, this bit field is reserved.
  3. Frequency domain resource assignment $-\lceil \log_2(N_{RB}^{DL,BWP}(N_{RB}^{DL,BWP}+1)/2) \rceil$ bits. If the short message is carried with the frequency domain resource assignment, this bit field is reserved. $N_{RB}^{DL,BWP}$ is the size of CORESET 0.
  4. Time domain resource assignment—4 bits as defined in Clause 5.1.2.1 of 3GPP TS 38.214. If the short message is carried with the time domain resource assignment, this bit field is reserved.
  5. VRB-to-PRB mapping—1 bit. If the short message is carried with the VRB-to-PRB mapping, this bit field is reserved.

6. Modulation and coding scheme—5 bits as defined in Clause 5.1.3 of 3GPP TS 38.214. If the short message is carried with the Modulation and coding scheme, this bit field is reserved.
7. TB scaling—2 bits as defined in Clause 5.1.3.2 of 3GPP TS 38.214. If the short message is carried with the TB scaling, this bit field is reserved.
8. Reserved bits—8 bits for operation in a cell with shared spectrum channel access; otherwise 6 bits.

TABLE 1

Short Message indicator

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

Short Message

Short messages can be transmitted on PDCCH by using P-RNTI with or without an associated paging message using a short message field in DCI format 1_0.

Table 2 illustrates an 8-bit short message, where Bit 1 is the most significant bit.

TABLE 2

Short Messages

| Bit | Short Message |
|---|---|
| 1 | systemInfoModification<br>If set to 1: indication of a BCCH modification other than SIB6, SIB7, and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this PO. |
| 4-8 | Not used in this release of the specification, and shall be ignored by UE if received. |

Paging Early Indication (PEI)

A PEI before a PO may indicate whether a UE needs to monitor a PDCCH addressed to a P-RNTI at the PO. With the PEI, the UE may be able to reduce the unnecessary paging DCI and/or paging message reception.

In some implementations, a PEI configuration may be configured for the UE (and/or applied by the UE) when the UE is in RRC_INACTIVE/RRC_IDLE state. The UE may receive system information and/or an RRC message including a PEI configuration. For example, when/after receiving the PEI configuration, the UE may be configured with the PEI configuration.

In some examples, a PEI may be configured by system information (e.g., SIB1 or 'other SI').

More specifically, a PEI may be configured by DownlinkConfigCommonSIB and/or ServingCellConfigCommonSIB.

In some examples, a PEI may be configured by an RRC release message (without or without suspend configuration).

In some examples, a PEI may be configured by an RRC reconfiguration message.

In some implementations, a PEI configuration may include a search space (SS). The UE may monitor the SS to receive a PEI (e.g., when the UE is in RRC_INACTIVE/RRC_IDLE state).

The SS for the PEI may be the common search space(s) configured in PDCCH-ConfigCommon, the type-1 PDCCH Common Search Space (CSS) set configured by ra-SearchSpace, the type-3 PDCCH CSS set, search space zero, a new common search space set configured via system information (e.g., SIB) or an RRC release message, search space with parameters of the search space(s) configured in the initial BWP, pagingsearchspace, searchspaceSIB1, etc.

In some implementations, a PEI may be transmitted by a NW to a UE via one or more of the following indications:
1. DCI-based indication (e.g., based on a DCI format (e.g., DCI format 1_0, DCI format 2_6, etc.)).
2. Reference Signal-based (RS-based) and/or sequence-based indication (e.g., based on a TRS/CSI-RS and/or SSS).

In some implementations, a PEI may indicate to the UE to perform one or more of the following behaviors:

In some examples, a PEI may indicate to a UE to monitor a PO (e.g., if the UE's group/subgroup is indicated by the PEI). For example, the UE may be required to monitor a PO when the UE detects PEI at one or more PEI occasions for the PO. For another example, a UE may not be required to monitor a PO when the UE does not detect a PEI at any or all PEI occasion(s) for the PO.

In some examples, a PEI may indicate whether a UE should monitor a PO (e.g., via a bit (e.g., when the UE's group/subgroup is indicated by the PEI)). For example, the UE may be required to monitor a PO if the bit indicates a first value. In another example, the UE may not be required to monitor a PO if the bit indicates a second value. Preferably, the UE may be required to monitor a PO when the UE does not detect a PEI at any or all PEI occasion(s) for the PO.

In some implementations, a PEI may indicate one or more of the following information (but is not limited thereto):
UE sub-grouping information (e.g., one or more (e.g., 2, 4, 8) subgroups per PO may be supported);
TRS/CSI-RS availability (e.g., available/unavailable);
System information modification indication; and/or
ETWS/CMAS indication.

DCI-Based PEI

Figure 6:
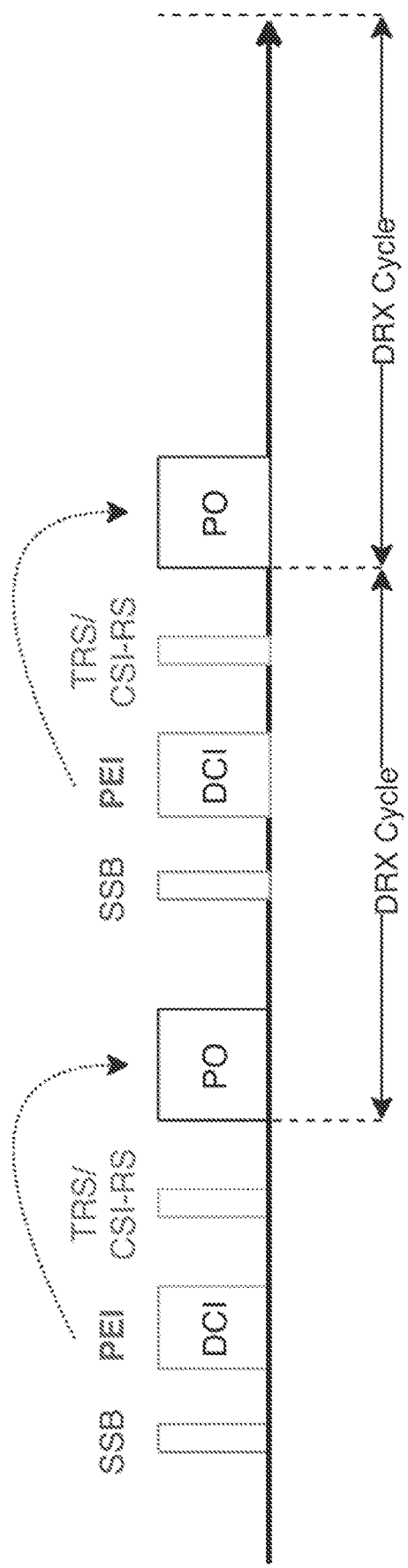
FIG. 6 is a timing diagram illustrating a DCI-based Paging Early Indication (PEI) in a DRX cycle, according to an implementation of the present disclosure.

FIG. 6 is a timing diagram illustrating a DCI-based PEI, according to an implementation of the present disclosure. As shown in FIG. 6, a PEI may be indicated by a DCI for a UE to monitor a PDCCH before a PO. The decoding of the DCI is a coherent demodulation with polar decoding. The performance requirement of channel compensation for a DCI-based PEI may be the same as that of DCI format 1_0 decoding for a paging DCI. For a PEI, SSB(s) and/or TRS/CSI-RS(s) may be measured in combination by a UE to perform channel tracking and local oscillator calibration, (e.g., before monitoring the PEI). A DCI-based PEI may indicate whether a UE monitors/decodes the paging DCI in the subsequent PO(s). When the UE detects/receives a DCI-based PEI, the UE may be indicated to wake up to monitor a PDCCH at a next PO (and/or to receive a paging message on the scheduled PDSCH). Otherwise, the UE may continue to sleep (and may not monitor the next POs) after receiving the DCI-based PEI.

Sequence-Based PEI

Figure 7:
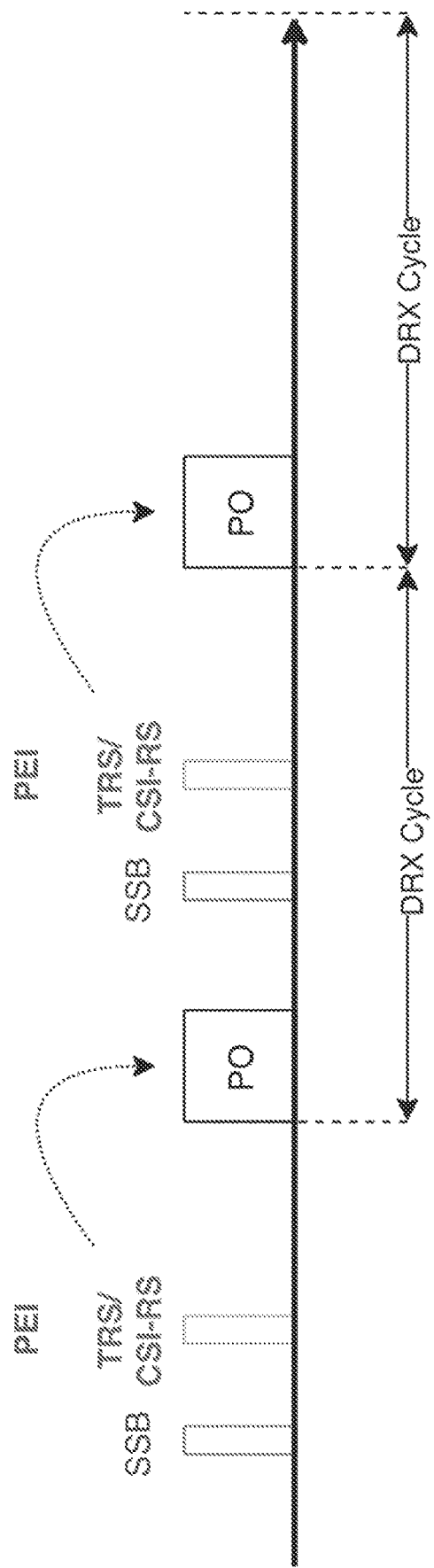
FIG. 7 is a timing diagram illustrating a sequence-based PEI in a DRX cycle, according to an implementation of the present disclosure.

A sequence-based PEI may be indicated by some RS types, such as SSS and/or TRS/CSI-RS. The detection of sequence-based PEI may be a non-coherent peak detection based on correlation with the received signals (e.g., similar to PSS/SSS detection). FIG. 7 is a timing diagram illustrating a sequence-based PEI, according to an implementation of the present disclosure. In FIG. 7, the sequence-based paging indication may not be used for a PEI via non-coherent detection but also as the reference signals for channel tracking. The sequence-based PEI may be combined with SSB(s) to indicate whether a UE monitors/decodes the paging DCI in the subsequent PO. When the UE detects the sequence-based PEI, the UE may wake up to monitor/decode the paging DCI at a next PO (and/or to receive a paging message on the scheduled PDSCH). Otherwise, the UE may continue to sleep (and may not monitor the next POs) after receiving the sequence-based PEI. Furthermore, one SSB burst set along with sequence-based PEI may be used for AGC, frequency/time tracking, and compensation to support RRM measurement and channel tracking.

A UE may be referred to as Physical Layer (PHY), Medium Access Control (MAC), Radio Link Control (RLC), Packet Data Convergence Protocol (PDCP), Service Data Adaptation Protocol (SDAP), Radio Resource Control (RRC), Access Stratum (AS), or Non-Access Stratum (NAS) layer/entity. The PHY/MAC/RLC/PDCP/SDAP/RRC/AS/NAS layer/entity may be referred to as the UE.

A network (NW) may be a network node, a Transmission/Reception Point (TRP), a cell (e.g., Special Cell (SpCell), Primary Cell (PCell), Primary SCell (PSCell), and/or Secondary Cell (SCell)), an eNB, a gNB, and/or a base station.

Serving Cell: A PCell, a PSCell, or an SCell. The serving cell may be an activated or a deactivated serving cell.

SpCell: For Dual Connectivity operation, the term Special Cell refers to the PCell of the MCG or the PSCell of the SCG depending on whether the MAC entity is associated with the MCG or the SCG, respectively. Otherwise, the term Special Cell refers to the PCell.

TRS/CSI-RS Availability Indication

For TRS/CSI-RS occasions configured to UEs in RRC_IDLE/RRC_INACTIVE state, the availability/unavailability of TRS/CSI-RS at the configured TRS/CSI-RS occasion(s) may be informed to the UE, by NW, based on an explicit indication. Thus, the UE may not perform a blind detection for a presence/absence of TRS/CSI-RS (e.g., TRS resource set). In other words, the UE may determine that TRS/CSI-RS is not present when the NW does not indicate the TRS/CSI-RS is available (or indicates the TRS/CSI-RS is unavailable).

In some implementations, the UE in RRC_IDLE/RRC_INACTIVE state may receive Layer 1 (L1)-based (L1-based) signaling (e.g., a paging DCI or a PEI) for an TRS/CSI-RS availability indication.

In some examples, the UE may monitor a paging DCI on a PO in every paging cycle. When the UE detects/receives a paging DCI on the PO, the UE may determine whether the paging DCI includes a TRS/CSI-RS availability indication. If the paging DCI includes the TRS/CSI-RS availability indication, the UE may determine whether the TRS/CSI-RS on the configured TRS/CSI-RS occasions is available/valid based on the TRS/CSI-RS availability indication.

More specifically, the paging DCI may be a DCI format 1_0 scrambled by a P-RNTI.

More specifically, the TRS/CSI-RS availability indication may be indicated by the paging DCI.

More specifically, the TRS/CSI-RS availability indication may be indicated in a short message indicator of the paging DCI.

More specifically, the TRS/CSI-RS availability indication may be indicated in a short message of the paging DCI.

In some examples, when a PEI is configured, the UE may monitor a PEI before a PO. When the UE detects/receives the PEI, the UE may determine whether the PEI includes a TRS/CSI-RS availability indication. If the PEI includes the TRS/CSI-RS availability indication, the UE may determine whether the TRS/CSI-RS on the configured TRS/CSI-RS occasions is available/valid based on the TRS/CSI-RS availability indication.

More specifically, the PEI may be a DCI-based PEI or a sequence-based PEI.

In some implementations, the UEs in RRC_IDLE/RRC_INACTIVE state may receive SI-based signaling for the TRS/CSI-RS availability indication.

In some examples, the UE may receive SI (e.g., by applying an SI acquisition procedure). When the UE receives the SI, the UE may determine whether the SI includes a TRS/CSI-RS availability indication. If the SI includes the TRS/CSI-RS availability indication, the UE may determine whether the TRS/CSI-RS on the configured TRS/CSI-RS occasions is available/valid based on the TRS/CSI-RS availability indication.

More specifically, the SI may be minimum SI (e.g., MIB, SIB1) and/or other SI (e.g., SIB2, SIB3, SIB4, SIB5, SIB6, SIB7, SIB8, SIB9, SIB10, SIB11, etc.)

More specifically, the UE may receive the SI on a Broadcast Control Channel (BCCH) and/or DL-shared channel (DL-SCH).

For information provided in the TRS/CSI-RS availability indication (e.g., indicated by paging DCI, PEI, and/or SI) for the configured TRS/CSI-RS occasion(s), the availability/unavailability information for configured TRS/CSI-RS resources (e.g., a TRS configuration including/indicating at least one TRS resource set) may be indicated via a bitmap or a codepoint.

In some examples, the bitmap may indicate the state of availability/unavailability for one or more sets of configured TRS/CSI-RS resources. Each bit of the bitmap may be associated with at least one TRS/CSI-RS resource for the set of TRS/CSI-RS resources.

In some examples, the codepoint/index may indicate a state of availability/unavailability for all or some of configured TRS/CSI-RS resources. One index may be associated with one or more TRS/CSI-RS resources or one or more sets of TRS/CSI-RS resources Usage of SI-Based and L1-Based TRS/CSI-RS Availability Indication It should be noted that a state of TRS/CSI-RS availability/unavailability may be indicated by L1-based signaling (e.g., paging DCI, PEI) or SI-based signaling. More specifically, the NW may configure/indicate an information/configuration to let the UE know that the UE can receive the TRS/CSI-RS availability information via L1-based signaling (e.g., paging DCI, PEI) or SI-based signaling. The TRS/CSI-RS availability information may be referred to as an L1-based availability indication.

In some implementations, a NW may not simultaneously use the L1-based signaling and SI-based signaling for indicating whether a TRS/CSI-RS is available/valid on the configured TRS/CSI-RS occasion. For example, when the NW configures/indicates the SI-based signaling for TRS/CSI-RS availability information, the NW may not configure/indicate the L1-based signaling for TRS/CSI-RS availability information. For another example, when the NW configures/indicates the L1-based signaling for TRS/CSI-RS availability information, the NW may not configure/indicate the SI-based signaling for TRS/CSI-RS availability information.

In some examples, when the UE is configured with SI-based signaling for TRS/CSI-RS availability information or if the received SI includes the TRS/CSI-RS availability information, the UE may not expect to receive the TRS/CSI-RS availability information in the L1-based signaling.

In some examples, if the TRS/CSI-RS availability information is not included in the SI-based signaling or if the TRS/CSI-RS availability information is absent in the SI-based signaling, the UE may expect to receive the TRS/CSI-RS availability information in the L1-based signaling (e.g., if the UE is configured with TRS/CSI-RS functionality).

In some examples, if the TRS/CSI-RS availability information is not included in the L1-based signaling or if the TRS/CSI-RS availability information is absent in the L1-based signaling, the UE may expect to receive the TRS/CSI-RS availability information in the SI-based signaling (e.g., if the UE is configured with TRS/CSI-RS functionality).

In some implementations, a NW may use both the L1-based signaling and SI-based signaling for TRS/CSI-RS availability information to indicate whether the TRS/CSI-RS is available/valid on the configured TRS/CSI-RS occasion. For example, the NW may use both the SI-based TRS/CSI-RS availability indication and the L1-based TRS/CSI-RS availability indication to indicate a state of TRS/CSI-RS availability/unavailability.

Therefore, the UE may determine whether a TRS/CSI-RS is available/valid based on both the L1-based signaling (e.g., paging DCI, PEI) and SI-based signaling. In some examples, the SI-based TRS/CSI-RS availability indication and the L1-based TRS/CSI-RS availability indication may indicate different information (e.g., different sets of TRS/CSI-RS resources, different states of availability/unavailability for a TRS/CSI-RS, different valid times, etc.).

Content of SI-Based and L1-Based TRS/CSI-RS Availability Indication

In some implementations, the SI-based and L1-based TRS/CSI-RS availability indication may include the same information (e.g., same set/group/index of a TRS/CSI-RS resource) for TRS/CSI-RS.

In some examples, if the SI-based TRS/CSI-RS availability indication indicates a first (set/group/index of) TRS/CSI-RS resource and a second (set/group/index of) TRS/CSI-RS resource, the L1-based TRS/CSI-RS availability indication may indicate the first (set/group/index of) TRS/CSI-RS resource and the second (set/group/index of) TRS/CSI-RS resource. In other words, the L1-based TRS/CSI-RS availability indication may not indicate a third (set/group/index of) TRS/CSI-RS resource.

In some implementations, the SI-based and L1-based TRS/CSI-RS availability indications may include different information (e.g., different set/group/index of TRS/CSI-RS resources) for TRS/CSI-RS.

In some examples, if the SI-based TRS/CSI-RS availability indication indicates a first (set/group/index of) TRS/CSI-RS resource and a second (set/group/index of) TRS/CSI-RS resource, the L1-based TRS/CSI-RS availability indication may not indicate the first (set/group/index of) TRS/CSI-RS resource and the second (set/group/index of) TRS/CSI-RS resource.

In some examples, if the SI-based TRS/CSI-RS availability indication includes a (set/group/index) of a TRS/CSI-RS resource, the L1-based may indicate the (set/group/index) of the TRS/CSI-RS resource which is not indicated by the SI-based TRS/CSI-RS availability indication.

In some implementations, the SI-based and L1-based TRS/CSI-RS availability indications may include the same format/field for TRS/CSI-RS or different formats/fields for TRS/CSI-RS.

In some examples, the number/field of (set/group/index of) TRS/CSI-RS resource(s) indicated by the SI-based and L1-based TRS/CSI-RS availability indication may be the same. Preferably, the bits of the field for indicating the (set/group/index of) TRS/CSI-RS resource(s) may be the same.

In some examples, if the SI-based TRS/CSI-RS availability indication is applied with a bitmap to indicate a state of TRS/CSI-RS availability/unavailability, the L1-based TRS/CSI-RS availability indication may be also applied with a bitmap to indicate a state of TRS/CSI-RS availability/unavailability. Preferably, if the SI-based TRS/CSI-RS availability indication is applied with a codepoint/index to indicate a state of TRS/CSI-RS availability/unavailability, the L1-based TRS/CSI-RS availability indication may be also applied with a codepoint/index to indicate a state of TRS/CSI-RS availability/unavailability In some implementations, the SI-based and L1-based TRS/CSI-RS availability indication may include different formats/fields for TRS/CSI-RS.

In some examples, the number/field of (set/group/index of) TRS/CSI-RS resource(s) indicated by the SI-based and L1-based TRS/CSI-RS availability indication may be different. Preferably, the bits of the field for indicating (set/group/index of) TRS/CSI-RS resource(s) may be different.

In some examples, if the SI-based TRS/CSI-RS availability indication is applied with a bitmap to indicate a state of TRS/CSI-RS availability/unavailability, the L1-based TRS/CSI-RS availability indication may be applied with a codepoint/index to indicate a state of TRS/CSI-RS availability/unavailability. Preferably, if the SI-based TRS/CSI-RS availability indication is applied with a codepoint/index to indicate a state of TRS/CSI-RS availability/unavailability, the L1-based TRS/CSI-RS availability indication may be applied with a bitmap to indicate a state of TRS/CSI-RS availability/unavailability.

Function of SI-Based and L1-Based TRS/CSI-RS Availability Indication

In some implementations, the SI-based TRS/CSI-RS availability indication may be used to configure which (set/group/index of) TRS/CSI-RS resource is indicated with a state of TRS/CSI-RS availability/unavailability by an L1-based TRS/CSI-RS availability indication.

In some examples, the SI-based TRS/CSI-RS availability indication may configure a first (set/group/index of) TRS/CSI-RS resource(s) and a second (set/group/index of) TRS/CSI-RS resource(s). The L1-based TRS/CSI-RS availability indication may indicate a state of TRS/CSI-RS availability/unavailability for the first (set/group/index of) TRS/CSI-RS resource(s) and the second (set/group/index of) TRS/CSI-RS resource(s).

In some examples, the L1-based TRS/CSI-RS availability indication may indicate a state of TRS/CSI-RS availability/unavailability for one, more, a subset, or all (set/group/index of) TRS/CSI-RS resource(s) configured by the SI-based TRS/CSI-RS availability indication.

In some implementations, the SI-based TRS/CSI-RS availability indication may be used to indicate a default/initial state of TRS/CSI-RS availability/unavailability for the (set/group/index of) TRS/CSI-RS resource(s).

In some examples, the SI-based TRS/CSI-RS availability indication may indicate a default/initial state of TRS/CSI-RS availability/unavailability for the (set/group/index of) TRS/

CSI-RS resource(s). Thus, the L1-based TRS/CSI-RS availability indication may be used to change/switch a state of TRS/CSI-RS availability/unavailability for the (set/group/index of) TRS/CSI-RS resource(s).

In some examples, when the UE is in RRC_IDLE/RRC_INACTIVE state, before receiving the L1-based TRS/CSI-RS availability indication, the UE may determine a state of TRS/CSI-RS availability/unavailability for the (set/group/index of) TRS/CSI-RS resource(s) based on the SI-based TRS/CSI-RS availability indication. When the UE further receives the L1-based TRS/CSI-RS availability indication, the UE may follow the instruction of the L1-based TRS/CSI-RS availability indication. Preferably, the UE may ignore the SI-based TRS/CSI-RS availability indication after receiving the L1-based TRS/CSI-RS availability indication.

In some examples, when the UE is in RRC_IDLE/RRC_INACTIVE state, if the UE has not received the SI-based TRS/CSI-RS availability indication, the UE may ignore the L1-based TRS/CSI-RS availability indication.

In some examples, a default/initial state of TRS/CSI-RS indicated in the SI-based TRS/CSI-RS availability indication may be available/valid.

In some examples, a default/initial state of TRS/CSI-RS indicated in the SI-based TRS/CSI-RS availability indication may be unavailable/invalid.

In some implementations, the SI-based TRS/CSI-RS availability indication may be used to indicate all the configured TRS/CSI-RS are available/unavailable at the same time (e.g., via one bit).

In some examples, if the SI-based TRS/CSI-RS availability indication indicates a first value (e.g., 1), the UE may determine that all the configured TRS/CSI-RS are available.

In some examples, if the SI-based TRS/CSI-RS availability indication indicates a second value (e.g., 0), the UE may determine that all the configured TRS/CSI-RS are unavailable.

In some implementations, the L1-based TRS/CSI-RS availability indication may be used to indicate all the configured TRS/CSI-RS are available/unavailable at the same time (e.g., via one bit).

In some examples, if the L1-based TRS/CSI-RS availability indication indicates a first value (e.g., 1), the UE may determine that all the configured TRS/CSI-RS are available.

In some examples, if the L1-based TRS/CSI-RS availability indication indicates a second value (e.g., 0), the UE may determine that all the configured TRS/CSI-RS are unavailable.

Priority of SI-Based and L1-Based TRS/CSI-RS Availability Indication

In some implementations, the UE may determine whether a TRS/CSI-RS on the configured TRS/CSI-RS occasion is available/valid based on the latest received signaling for indicating a state of TRS/CSI-RS availability/unavailability.

In some examples, when the UE receives an SI-based TRS/CSI-RS availability indication, and the UE receives an L1-based TRS/CSI-RS availability indication after the SI-based TRS/CSI-RS availability indication, the UE may determine whether a TRS/CSI-RS on the configured TRS/CSI-RS occasion is available/valid based on the L1-based TRS/CSI-RS availability indication.

In some examples, when the UE receives an L1-based TRS/CSI-RS availability indication, and the UE receives an SI-based TRS/CSI-RS availability indication after the L1-based TRS/CSI-RS availability indication, the UE may determine whether a TRS/CSI-RS on the configured TRS/CSI-RS occasion is available/valid based on the SI-based TRS/CSI-RS availability indication.

In some implementations, the priority of the SI-based TRS/CSI-RS availability indication may be higher than the L1-based TRS/CSI-RS availability indication.

In some examples, when the UE receives an SI-based TRS/CSI-RS availability indication and an L1-based TRS/CSI-RS availability indication, the UE may determine whether a TRS/CSI-RS on the configured TRS/CSI-RS occasion is available/valid based on the SI-based TRS/CSI-RS availability indication.

In some examples, when the UE receives an SI-based TRS/CSI-RS availability indication and an L1-based TRS/CSI-RS availability indication, the UE may ignore the L1-based TRS/CSI-RS availability indication.

In some examples, when the UE receives an SI-based TRS/CSI-RS availability indication that indicates that a first TRS/CSI-RS on the configured TRS/CSI-RS occasion is unavailable/invalid, but an L1-based TRS/CSI-RS availability indication indicates that the first TRS/CSI-RS on the configured TRS/CSI-RS occasion is available/valid, the UE may determine that the first TRS/CSI-RS on the configured TRS/CSI-RS occasion is unavailable/invalid.

In some implementations, the priority of the L1-based TRS/CSI-RS availability indication may be higher than the SI-based TRS/CSI-RS availability indication.

In some examples, when the UE receives an SI-based TRS/CSI-RS availability indication and an L1-based TRS/CSI-RS availability indication, the UE may determine whether a TRS/CSI-RS on the configured TRS/CSI-RS occasion is available/valid based on the L1-based TRS/CSI-RS availability indication.

In some examples, when the UE receives an SI-based TRS/CSI-RS availability indication and an L1-based TRS/CSI-RS availability indication, the UE may ignore the SI-based TRS/CSI-RS availability indication.

In some examples, when the UE receives an L1-based TRS/CSI-RS availability indication that indicates that a first TRS/CSI-RS on the configured TRS/CSI-RS occasion is unavailable/invalid, but an SI-based TRS/CSI-RS availability indication indicates that the first TRS/CSI-RS on the configured TRS/CSI-RS occasion is available/valid, the UE may determine that the first TRS/CSI-RS on the configured TRS/CSI-RS occasion is unavailable/invalid.

Limitation of SI-Based and L1-Based TRS/CSI-RS Availability Indication

In some implementations, the SI-based TRS/CSI-RS availability indication may be used to indicate whether a TRS/CSI-RS on the configured TRS/CSI-RS occasion is available/valid while the L1-based TRS/CSI-RS availability indication may be used to indicate whether the TRS/CSI-RS on the configured TRS/CSI-RS occasion is unavailable/invalid.

In some implementations, the L1-based TRS/CSI-RS availability indication may be used to indicate whether a TRS/CSI-RS on the configured TRS/CSI-RS occasion is available/valid while the SI-based TRS/CSI-RS availability indication may be used to indicate whether a TRS/CSI-RS on the configured TRS/CSI-RS occasion is unavailable/invalid.

In some implementations, if the SI-based TRS/CSI-RS availability indication indicates that a TRS/CSI-RS on the configured TRS/CSI-RS occasion is available/valid, the L1-based TRS/CSI-RS availability indication may not indicate a TRS/CSI-RS on the configured TRS/CSI-RS occasion is unavailable/invalid. Preferably, if the L1-based TRS/CSI-RS availability indication indicates that a TRS/CSI-RS on the configured TRS/CSI-RS occasion is unavailable/invalid, the UE may ignore the L1-based TRS/CSI-RS availability indication.

In some implementations, if the SI-based TRS/CSI-RS availability indication indicates that a TRS/CSI-RS on the configured TRS/CSI-RS occasion is unavailable/invalid, the L1-based TRS/CSI-RS availability indication may not indicate a TRS/CSI-RS on the configured TRS/CSI-RS occasion is available/valid. Preferably, if the L1-based TRS/CSI-RS availability indication indicates that a TRS/CSI-RS on the configured TRS/CSI-RS occasion is available/valid, the UE may ignore the L1-based TRS/CSI-RS availability indication.

In some implementations, if the L1-based TRS/CSI-RS availability indication indicates that a TRS/CSI-RS on the configured TRS/CSI-RS occasion is available/valid, the SI-based TRS/CSI-RS availability indication may not indicate a TRS/CSI-RS on the configured TRS/CSI-RS occasion is unavailable/invalid. Preferably, if the SI-based TRS/CSI-RS availability indication indicates that a TRS/CSI-RS on the configured TRS/CSI-RS occasion is unavailable/invalid, the UE may ignore the SI-based TRS/CSI-RS availability indication.

In some implementations, if the L1-based TRS/CSI-RS availability indication indicates that a TRS/CSI-RS on the configured TRS/CSI-RS occasion is unavailable/invalid, the SI-based TRS/CSI-RS availability indication may not indicate a TRS/CSI-RS on the configured TRS/CSI-RS occasion is available/valid. Preferably, if the SI-based TRS/CSI-RS availability indication indicates that a TRS/CSI-RS on the configured TRS/CSI-RS occasion is available/valid, the UE may ignore the SI-based TRS/CSI-RS availability indication.

In some implementations, the L1-based TRS/CSI-RS availability indication may indicate a state of the TRS/CSI-RS on the configured TRS/CSI-RS occasion if the TRS/CSI-RS on the configured TRS/CSI-RS occasion is indicated as available/valid.

In some implementations, the L1-based TRS/CSI-RS availability indication may indicate a state of the TRS/CSI-RS on the configured TRS/CSI-RS occasion if the TRS/CSI-RS on the configured TRS/CSI-RS occasion is indicated as unavailable/invalid.

TRS/CSI-RS Validity Time

TRS/CSI-RS validity time is a time duration in which the UE determines that the TRS/CSI-RS availability indication is valid. If an TRS/CSI-RS availability indication is received in a TRS/CSI-RS validity time, the UE may not re-acquire other TRS/CSI-RS availability indications in the same TRS/CSI-RS validity time.

In some examples, the UE may not receive/acquire the SIB for the SI-based TRS/CSI-RS availability indication in the TRS/CSI-RS validity time.

In some examples, the UE may ignore the TRS/CSI-RS availability/unavailability information included in the SI-based TRS/CSI-RS availability indication in the TRS/CSI-RS validity time (e.g., if the UE receives the SI-based TRS/CSI-RS availability indication).

In some examples, the UE may ignore the TRS/CSI-RS availability/unavailability information included in the L1-based TRS/CSI-RS availability indication in the TRS/CSI-RS validity time (e.g., if the UE receives the L1-based TRS/CSI-RS availability indication).

In some implementations, when an SI is used for a TRS/CSI-RS availability indication, the SI can indicate a TRS/CSI-RS is available/unavailable. Preferably, the TRS/CSI-RS validity time may be started when the UE receives the SI (that indicates the TRS/CSI-RS availability indication).

In some examples, the TRS/CSI-RS validity time may be the time duration between a first SI (that indicates a TRS/CSI-RS availability indication) and a second SI.

More specifically, the second SI may be the next SI after the first SI (that indicates the TRS/CSI-RS availability indication).

More specifically, the second SI may be one or more SIs after the first SI (that indicates the TRS/CSI-RS availability indication).

More specifically, the time duration between the first SI (that indicates the TRS/CSI-RS availability indication) and the second SI may be configured by a periodicity for the SI (e.g., si-Periodicity).

In some examples, the TRS/CSI-RS validity time may be the time duration between SI (that indicates a TRS/CSI-RS availability indication) and a PO.

More specifically, the PO may be the next PO after the SI (that indicates the TRS/CSI-RS availability indication).

More specifically, the PO may be one or more POs after the SI (that indicates the TRS/CSI-RS availability indication).

More specifically, the TRS/CSI-RS validity time may end at the first symbol, slot, subframe, SFN, or PDCCH monitoring occasion of the PO.

More specifically, the TRS/CSI-RS validity time may end at the last symbol, slot, subframe, SFN, or PDCCH monitoring occasion of the PO.

In some examples, the TRS/CSI-RS validity time may be the time duration between an SI (that indicates a TRS/CSI-RS availability indication) and a PEI monitoring occasion.

More specifically, the PEI monitoring occasion may be the next PEI monitoring occasion after the SI (that indicates the TRS/CSI-RS availability indication).

More specifically, the PEI monitoring occasion may be one or more PEI monitoring occasions after the SI (which indicates the TRS/CSI-RS availability indication).

More specifically, the TRS/CSI-RS validity time may end at the first symbol, slot, subframe, SFN, or PDCCH monitoring occasion of the PEI monitoring occasion.

More specifically, the TRS/CSI-RS validity time may end at the last symbol, slot, subframe, SFN, or PDCCH monitoring occasion of the PEI monitoring occasion.

In some implementations, when paging DCI is used for a TRS/CSI-RS availability indication, the paging DCI can indicate a TRS/CSI-RS is available/unavailable. Preferably, the TRS/CSI-RS validity time may be started when the UE receives the paging DCI (that indicates the TRS/CSI-RS availability indication).

In some examples, the TRS/CSI-RS validity time may be the time duration between a first paging DCI (that indicates a TRS/CSI-RS availability indication) and a second paging DCI.

More specifically, the second paging DCI may be the next received paging DCI after the first paging DCI (that indicates the TRS/CSI-RS availability indication).

More specifically, the second paging DCI may be one or more received paging DCIS after the first paging DCI (that indicates the TRS/CSI-RS availability indication).

More specifically, the time duration between the first paging DCI (that indicates the TRS/CSI-RS availability indication) and the second paging DCI may be configured by a DRX cycle.

In some examples, the TRS/CSI-RS validity time may be the time duration between a paging DCI (that indicates the TRS/CSI-RS availability indication) and a PO.

More specifically, the PO may be the next PO after the paging DCI (that indicates the TRS/CSI-RS availability indication).

More specifically, the PO may be one or more Pos after the paging DCI (that indicates the TRS/CSI-RS availability indication).

More specifically, the TRS/CSI-RS validity time may end at the first symbol, slot, subframe, SFN, or PDCCH monitoring occasion of the PO.

More specifically, the TRS/CSI-RS validity time may end at the last symbol, slot, subframe, SFN, or PDCCH monitoring occasion of the PO.

In some examples, the TRS/CSI-RS validity time may be the time duration between a paging DCI (that indicates a TRS/CSI-RS availability indication) and a PEI monitoring occasion.

More specifically, the PEI monitoring occasion may be the next PEI monitoring occasion after the paging DCI (that indicates the TRS/CSI-RS availability indication).

More specifically, the PEI monitoring occasion may be one or more PEI monitoring occasions after the paging DCI (that indicates the TRS/CSI-RS availability indication).

More specifically, the TRS/CSI-RS validity time may end at the first symbol, slot, subframe, SFN, or PDCCH monitoring occasion of the PEI monitoring occasion.

More specifically, the TRS/CSI-RS validity time may end at the last symbol, slot, subframe, SFN, or PDCCH monitoring occasion of the PEI monitoring occasion.

Figure 8:
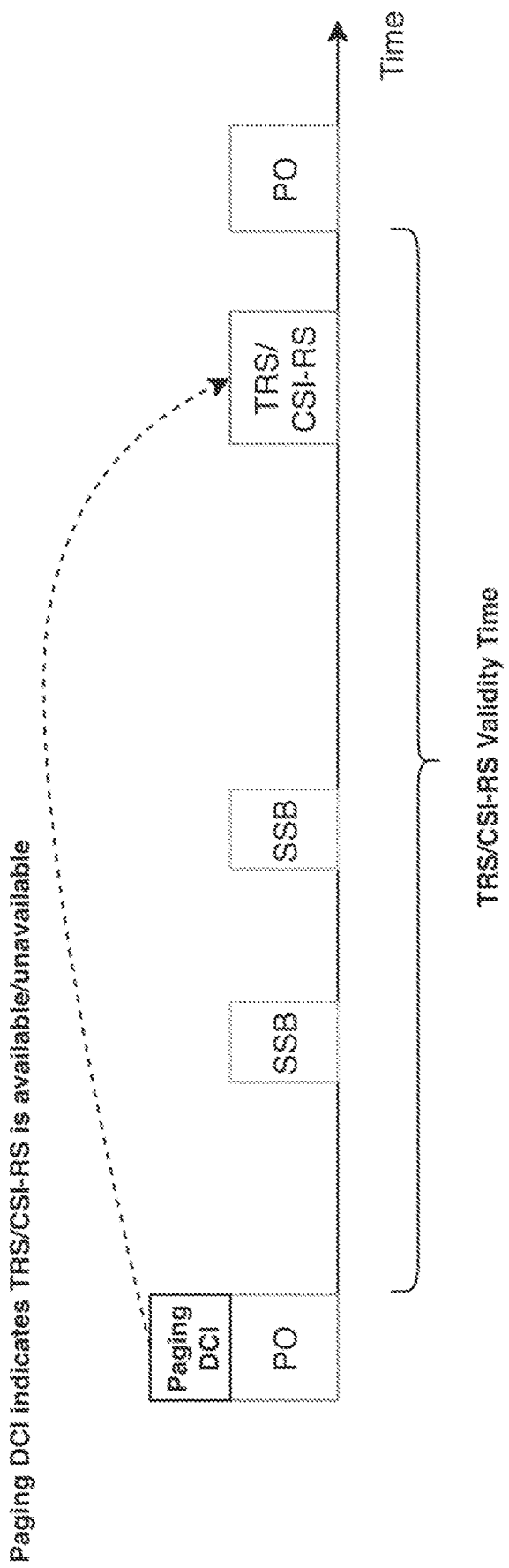
FIG. 8 is a timing diagram illustrating TRS/CSI-RS validity time for a paging DCI, according to an implementation of the present disclosure.

FIG. 8 is a timing diagram illustrating TRS/CSI-RS validity time for a paging DCI, according to an implementation of the present disclosure. In the example illustrated in FIG. 8, the validity time may be the time duration between the paging DCI and the (subsequent) PO.

In some implementations, when a PEI is used for a TRS/CSI-RS availability indication, the PEI can indicate a TRS/CSI-RS is available/unavailable. Preferably, the TRS/CSI-RS validity time may be started when the UE receives the PEI (that indicates the TRS/CSI-RS availability indication).

In some examples, the TRS/CSI-RS validity time may be the time duration between a first PEI (that indicates a TRS/CSI-RS availability indication) and a second PEI.

More specifically, the second PEI may be the next received PEI after the first PEI (that indicates the TRS/CSI-RS availability indication).

More specifically, the second PEI may be one or more received PEIs after the first PEI (that indicates the TRS/CSI-RS availability indication).

More specifically, the time duration between the first PEI (that indicates the TRS/CSI-RS availability indication) and the second PEI may be configured by a DRX cycle and/or a periodicity for the PEI (e.g., configured in the PEI configuration).

In some examples, the TRS/CSI-RS validity time may be the time duration between a PEI (that indicates a TRS/CSI-RS availability indication) and a PO.

More specifically, the PO may be the next PO after the PEI (that indicates the TRS/CSI-RS availability indication).

More specifically, the PO may be one or more POs after the PEI (that indicates the TRS/CSI-RS availability indication).

More specifically, the TRS/CSI-RS validity time may end at the first symbol, slot, subframe, SFN, or PDCCH monitoring occasion of the PO.

More specifically, the TRS/CSI-RS validity time may end at the last symbol, slot, subframe, SFN, or PDCCH monitoring occasion of the PO.

In some examples, the TRS/CSI-RS validity time may be the time duration between a PEI (that indicates a TRS/CSI-RS availability indication) and a PEI monitoring occasion.

More specifically, the PEI monitoring occasion may be the next PEI monitoring occasion after the PEI (that indicates the TRS/CSI-RS availability indication).

More specifically, the PEI monitoring occasion may be one or more PEI monitoring occasions after the PEI (that indicates the TRS/CSI-RS availability indication).

More specifically, the TRS/CSI-RS validity time may end at the first symbol, slot, subframe, SFN, or PDCCH monitoring occasion of the PEI monitoring occasion.

More specifically, the TRS/CSI-RS validity time may end at the last symbol, slot, subframe, SFN, or PDCCH monitoring occasion of the PEI monitoring occasion.

Figure 9:
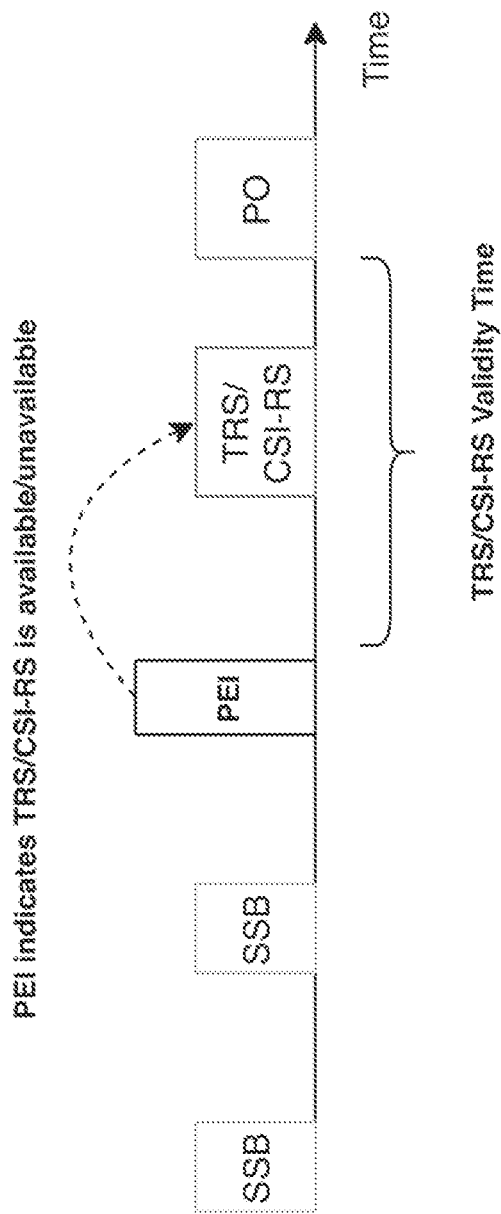
FIG. 9 is a timing diagram illustrating TRS/CSI-RS validity time for a PEI, according to an implementation of the present disclosure.

FIG. 9 is a timing diagram illustrating TRS/CSI-RS validity time for a PEI, according to an implementation of the present disclosure. In the example illustrated in FIG. 9, the TRS/CSI-RS validity time may be the time duration between a PEI and a (subsequent) PO.

Timer/Window-Based

In some implementations, a timer/window may be configured for a TRS/CSI-RS validity indication. The UE may determine whether a state of the TRS/CSI-RS indicated in the TRS/CSI-RS availability indication is valid based on the timer/window. Preferably, the unit of the timer/window may be symbol, slot, subframe, SFN, ms, second (s), number of DRX cycles, number of POs, number of Paging Frames (PFs), number of PDCCH monitoring occasions, etc.

In some examples, when the timer/window is running, the UE may determine that a state of the TRS/CSI-RS indicated in a TRS/CSI-RS availability indication is valid.

Preferably, when the timer/window is running, the UE may determine whether a TRS/CSI-RS is available/valid based on the TRS/CSI-RS availability indication.

Preferably, when the timer/window is running, the UE may determine whether a TRS/CSI-RS is available/valid based on an L1-based TRS/CSI-RS availability indication or an SI-based TRS/CSI-RS availability indication.

In some examples, when the timer/window is not running (or is expired), the UE may determine that a state of the TRS/CSI-RS indicated in a TRS/CSI-RS availability indication is invalid.

Preferably, when the timer/window is not running (or is expired), the UE may not determine whether a TRS/CSI-RS is available/valid based on the TRS/CSI-RS availability indication.

Preferably, when the timer/window is not running (or is expired), the UE may determine whether a TRS/CSI-RS is available/valid based on an SI-based TRS/CSI-RS availability indication and may not determine based on an L1-based TRS/CSI-RS availability indication.

Preferably, when the timer/window is not running (or is expired), the UE may determine that (all) TRS/CSI-RS is not available/valid.

In some examples, the timer/window configured for a TRS/CSI-RS validity indication may be configured as infinity. If the timer/window is configured as infinity, the UE may determine that a state of the TRS/CSI-RS indicated in a TRS/CSI-RS availability indication is always valid.

In some implementations, a timer/window may be used/configured for an SI-based TRS/CSI-RS availability indication and/or an L1-based TRS/CSI-RS availability indication.

In some examples, the timer/window may be used/configured for an SI-based TRS/CSI-RS availability indication.

Preferably, when the timer/window used/configured for an SI-based TRS/CSI-RS availability indication is running, the UE may determine whether a TRS/CSI-RS is available/valid based on the SI-based TRS/CSI-RS availability indication.

Preferably, when the timer/window used/configured for an SI-based TRS/CSI-RS availability indication is not running (or is expired), the UE may determine whether a TRS/CSI-RS is available/valid based on the L1-based TRS/CSI-RS availability indication.

In some examples, the timer/window may be used/configured for an L1-based TRS/CSI-RS availability indication.

Preferably, when the timer/window used/configured for an L1-based TRS/CSI-RS availability indication is running, the UE may determine whether a TRS/CSI-RS is available/valid based on an L1-based TRS/CSI-RS availability indication.

Preferably, when the timer/window used/configured for an L1-based TRS/CSI-RS availability indication is not running (or is expiry), the UE may determine whether a TRS/CSI-RS is available/valid based on an SI-based TRS/CSI-RS availability indication.

In some examples, the timer/window may be used/configured for both an SI-based TRS/CSI-RS availability indication and an L1-based TRS/CSI-RS availability indication.

Preferably, when the timer/window used/configured for an SI-based TRS/CSI-RS availability indication and an L1-based TRS/CSI-RS availability indication is running, the UE may determine whether the TRS/CSI-RS is available/valid based on an SI-based TRS/CSI-RS availability indication and an L1-based RS/CSI-RS availability indication.

Preferably, the UE may maintain one timer/window for both an SI-based TRS/CSI-RS availability indication and an L1-based TRS/CSI-RS availability indication.

Preferably, the UE may maintain/apply a first timer/window for an SI-based TRS/CSI-RS availability indication and maintain/apply a second timer/window for an L1-based TRS/CSI-RS availability indication.

Preferably, the UE may maintain one timer/window for both a paging DCI-based TRS/CSI-RS availability indication and a PEI-based TRS/CSI-RS availability indication.

Preferably, the UE may maintain/apply a first timer/window for a paging DCI-based TRS/CSI-RS availability indication and maintain/apply a second timer/window for a PEI-based TRS/CSI-RS availability indication.

In some implementations, the UE may (re-)start the timer/window configured for a (L1-based and/or SI-based) TRS/CSI-RS availability indication in one or more of the following conditions.

In some examples, the UE may (re-)start the timer/window configured for a (L1-based and/or SI-based) TRS/CSI-RS availability indication when receiving an SI-based TRS/CSI-RS availability indication (that indicates a TRS/CSI-RS is available/valid and/or unavailable/invalid).

In some examples, the UE may (re-)start the timer/window configured for a (L1-based and/or SI-based) TRS/CSI-RS availability indication when receiving an L1-based TRS/CSI-RS availability indication (that indicates a TRS/CSI-RS is available/valid and/or unavailable/invalid).

In some examples, the UE may (re-)start the timer/window configured for a (L1-based and/or SI-based) TRS/CSI-RS availability indication when receiving an RRC message (e.g., RRCResume, RRCSetup, RRCRelease, RRCRelease with SuspendConfig, RRCReestablishment, and/or RRCReject).

More specifically, the RRC message may be used to (re)configure the (availability of) TRS/CSI-RS (resource/configuration).

In some implementations, the UE may stop/release the timer/window configured for the TRS/CSI-RS availability indication in one or more of the following conditions.

In some examples, the UE may stop/release the timer/window configured for a (L1-based and/or SI-based) TRS/CSI-RS availability indication when receiving an SI-based TRS/CSI-RS availability indication (that indicates a TRS/CSI-RS is unavailable/invalid).

In some examples, the UE may stop/release the timer/window configured for a (L1-based and/or SI-based) TRS/CSI-RS availability indication when receiving an L1-based TRS/CSI-RS availability indication (that indicates a TRS/CSI-RS is unavailable/invalid).

In some examples, the UE may stop/release the timer/window configured for a (L1-based and/or SI-based) TRS/CSI-RS availability indication when receiving an RRC message (e.g., RRCResume, RRC Setup, RRCRelease, RRCRelease with SuspendConfig, RRCReestablishment, and/or RRCReject).

More specifically, the RRC message may be used to release the (availability of) TRS/CSI-RS (resource/configuration).

In some examples, the UE may stop/release the timer/window configured for a (L1-based and/or SI-based) TRS/CSI-RS availability indication during cell selection or re-selection.

In some examples, the UE may stop/release the timer/window configured for a (L1-based and/or SI-based) TRS/CSI-RS availability indication when the UE moves to another RAT (e.g., E-UTRA).

In some examples, the UE may stop/release the timer/window configured for a (L1-based and/or SI-based) TRS/CSI-RS availability indication when the UE performs an abortion of connection establishment (e.g., by an upper layer).

In some examples, the UE may stop/release the timer/window configured for a (L1-based and/or SI-based) TRS/CSI-RS availability indication during a RAN notification area (RNA) update.

In some examples, the UE may stop/release the timer/window configured for a (L1-based and/or SI-based) TRS/CSI-RS availability indication when the UE changes the serving cell to another cell or when the UE camps on a new (suitable/acceptable) cell.

In some examples, the UE may stop/release the timer/window configured for a (L1-based and/or SI-based) TRS/CSI-RS availability indication when the UE initiates an RRC re-establishment procedure. For example, the timer/window may be stopped/released when the UE sends an RRCReestablishmentRequest to the network.

In some examples, the UE may stop/release the timer/window configured for a (L1-based and/or SI-based) TRS/CSI-RS availability indication when the UE is indicated, by the network, to perform a carrier switching (e.g., from Normal Uplink (NUL) to Supplementary Uplink (SUL) or vice versa).

In some examples, the UE may stop/release the timer/window configured for a (L1-based and/or SI-based) TRS/CSI-RS availability indication when the UE is indicated, by the network, to perform a (UL/DL) BWP switching.

In some implementations, upon expiry of the timer/window configured for a TRS/CSI-RS availability indication, the UE may perform one or more of the following actions:

In some examples, upon expiry of the timer/window configured for a TRS/CSI-RS availability indication, the UE may determine whether a TRS/CSI-RS on the configured TRS/CSI-RS occasion is available/valid.

More specifically, an SI-based TRS/CSI-RS availability indication may be used to indicate a default/initial state of TRS/CSI-RS availability/unavailability for the (set/group/index of) TRS/CSI-RS resource(s).

More specifically, a default/initial state of TRS/CSI-RS indicated in an SI-based TRS/CSI-RS availability indication may be available/valid.

More specifically, a default/initial state of TRS/CSI-RS indicated in an SI-based TRS/CSI-RS availability indication may be unavailable/invalid.

In some examples, upon expiry of the timer/window configured for an TRS/CSI-RS availability indication, the UE may release the (availability of) TRS/CSI-RS (resource/configuration).

In some examples, upon expiry of the timer/window configured for a TRS/CSI-RS availability indication, the UE may apply an SI acquisition procedure.

In some examples, upon expiry of the timer/window configured for a TRS/CSI-RS availability indication, the UE may (immediately) (re-)acquire SI.

More specifically, the SI may be minimum SI (e.g., MIB, SIB1) and/or other SI (e.g., SIB2, SIB3, SIB4, SIB5, SIB6, SIB7, SIB8, SIB9, SIB10, SIB11, etc.).

More specifically, the SI may be received on BCCH and/or DL-SCH.

In some examples, upon expiry of the timer/window configured for a TRS/CSI-RS availability indication, the UE may determine that the indicated state of the TRS/CSI-RS by a TRS/CSI-RS availability indication is invalid.

In some examples, upon expiry of the timer/window configured for a TRS/CSI-RS availability indication, the UE may not determine whether the TRS/CSI-RS is available/valid based on the indicated TRS/CSI-RS indication.

In some examples, upon expiry of the timer/window configured for a TRS/CSI-RS availability indication, the UE may determine whether the TRS/CSI-RS is available/valid based on an SI-based TRS/CSI-RS availability indication and may not determine based on an L1-based TRS/CSI-RS availability indication.

In some examples, upon expiry of the timer/window configured for a TRS/CSI-RS availability indication, the UE may determine that (all) the TRS/CSI-RS is not available/valid.

In some examples, upon expiry of the timer/window configured for a TRS/CSI-RS availability indication, the UE may enter RRC_IDLE state.

In some examples, upon expiry of the timer/window configured for a TRS/CSI-RS availability indication, the UE may stay in RRC_INACTIVE state.

In some examples, upon expiry of the timer/window configured for a TRS/CSI-RS availability indication, the UE may initiate an RRC establishment procedure (e.g., via RRCSetupRequest).

In some examples, upon expiry of the timer/window configured for a TRS/CSI-RS availability indication, the UE may initiate an RRC reestablishment procedure (e.g., via RRCRestablishmentRequest).

In some examples, upon expiry of the timer/window configured for a TRS/CSI-RS availability indication, the UE may initiate an RRC connection resume procedure (e.g., via RRCResumeReques).

Time Duration-Based

In some implementations, the UE may be configured with a validity time duration with a unit (e.g., symbol, slot, subframe, SFN, ms, s, number of DRX cycles, number of POs, number of PFs, number of PDCCH monitoring occasions).

In some examples, within the validity time duration, the UE may determine whether a TRS/CSI-RS is available/valid based on a TRS/CSI-RS availability indication.

In some examples, within the validity time duration, the UE may determine whether a TRS/CSI-RS is available/valid based on L1-based TRS/CSI-RS availability indication and/or the SI-based TRS/CSI-RS availability indication.

In some examples, the validity time duration with the unit may be configured in a configuration for TRS/CSI-RS (which may be configured by a SIB and/or a RRC message).

In some examples, outside the validity time duration, the UE may not determine whether the TRS/CSI-RS is available/valid based on the TRS/CSI-RS availability indication.

In some examples, outside the validity time duration, the UE may determine whether the TRS/CSI-RS is available/valid based on SI-based TRS/CSI-RS availability indication and may not determine based on the L1-based TRS/CSI-RS availability indication.

In some examples, outside the validity time duration, the UE may determine that (all) the TRS/CSI-RS is not available/valid.

In some examples, the validity time duration with a unit may be started when the UE receives SI (that indicates TRS/CSI-RS availability indication), a paging DCI (that indicates TRS/CSI-RS availability indication), and/or a PEI (that indicates TRS/CSI-RS availability indication).

In some examples, the validity time duration with a unit may be ended based on the configured value for the validity time duration and the units.

In some examples, the validity time duration with a unit may be counted by a counter. In some examples, the validity time duration may be configured by a periodicity.

In some examples, the validity time duration may be configured as infinity. If the validity time duration is configured as infinity, the UE may determine that a state of the TRS/CSI-RS indicated in an TRS/CSI-RS availability indication is always valid.

PEI Indicating SI Modification and/or ETWS/CMAS

SI Modification Indication

A PEI may include an SI modification indication.

More specifically, the SI modification may refer to BCCH modification (e.g., other than SIB6, SIB7, and SIB8).

In some implementations, the UE may determine whether to apply an SI acquisition procedure (from the start of the next modification period) based on an SI modification indication included in the PEI.

In some examples, when the UE receives a PEI, and if an SI modification indication included in the PEI is set to a first value (e.g., 1), the UE may apply an SI acquisition procedure (from the start of the next modification period).

In some examples, when the UE receives a PEI, and if an SI modification indication included in the PEI is set to a second value (e.g., 0), the UE may not apply an SI acquisition procedure.

The first value and the second value may be different.

In some examples, when the UE receives a PEI, and if an SI modification indication is not included (e.g., is not present, is absent) in the PEI, the UE may not apply an SI acquisition procedure.

In some implementations, when the UE is configured with a PEI (and/or if the UE receives the PEI), the UE may determine whether to apply an SI acquisition procedure based on a first SI modification indication included in the PEI and may or may not determine whether to apply an SI acquisition procedure (from the start of the next modification period) based on a second SI modification indication included in the short message (of a paging DCI). More specifically, when the UE receives a PEI, the PEI may indicate whether the UE needs to monitor the subsequent PO. If the PEI indicates to the UE to monitor the subsequent PO, the UE may receive a short message (of a paging DCI) on the subsequent PO.

In some examples, when the UE is configured with a PEI (and/or if the UE receives the PEI), the UE may determine whether to apply an SI acquisition procedure (from the start of the next modification period) based on an SI modification indication included in the PEI. Then, if the UE receives a short message (of a paging DCI) (e.g., on the subsequent PO), the UE may ignore/skip a second SI modification indication included in the short message (of a paging DCI).

Preferably, the UE may only ignore/skip a second SI modification indication included in the short message (of a paging DCI) if the first SI modification indication is set to a first value (e.g., 1) to indicate to the UE to apply an SI acquisition procedure (from the start of the next modification period).

Preferably, the UE may only ignore/skip a second SI modification indication included in the short message (of a paging DCI) if the first SI modification indication is set to a second value (e.g., 0) to indicate to the UE not to apply an SI acquisition procedure (from the start of the next modification period).

More specifically, the priority of the first SI modification indication included in the PEI may be higher than the second SI modification indication included in the short message (of a paging DCI).

In some examples, when the UE is configured with a PEI (and/or if the UE receives the PEI), the UE may determine whether to apply an SI acquisition procedure (from the start of the next modification period) based on an SI modification indication included in the PEI. Then, when the UE receives a short message (of a paging DCI) (e.g., on the subsequent PO), the UE may consider a second SI modification indication is not present (or is absent) in the short message (of a paging DCI).

Preferably, the UE may determine a second SI modification indication is not present (or is absent) in the short message (of a paging DCI) if the first SI modification indication is set to a first value (e.g., 1) to indicate to the UE to apply an SI acquisition procedure (from the start of the next modification period).

Preferably, the UE may determine a second SI modification indication is not present (or is absent) in the short message (of a paging DCI) if the first SI modification indication is set to a second value (e.g., 0) to indicate to the UE not to apply an SI acquisition procedure (from the start of the next modification period).

In some examples, when the UE is configured with a PEI (and/or if the UE receives the PEI), the UE may determine whether to apply an SI acquisition procedure (from the start of the next modification period) based on an SI modification indication included in the PEI. Then, when the UE receives a short message (of a paging DCI) (e.g., on the subsequent PO), the UE may further determine whether to apply an SI acquisition procedure (from the start of the next modification period) based on a second SI modification indication included in the short message (of a paging DCI).

In some examples, when the UE receives a first SI modification indication included in the PEI and then a second SI modification indication included in the short message (of a paging DCI), the UE may ignore the first SI modification indication and apply the second SI modification indication.

In some examples, when the UE receives a first SI modification indication included in the PEI and then a second SI modification indication included in the short message (of a paging DCI), the UE may replace the first SI modification indication with the second SI modification indication.

In some examples, if the first SI modification indication included in the PEI indicates to the UE to apply an SI acquisition procedure (from the start of the next modification period) but the second modification indication included in the short message (of a paging DCI) indicates to the UE not to apply an SI acquisition procedure (from the start of the next modification period), the UE may follow (or replace with) the instruction from the second SI modification indication. For example, the UE may not apply an SI acquisition procedure (from the start of the next modification period).

Preferably, the UE may further determine whether to apply an SI acquisition procedure (from the start of the next modification period) based on a second SI modification indication included in the short message (of a paging DCI) if the first SI modification indication is set to a first value (e.g., 1) to indicate to the UE to apply an SI acquisition procedure (from the start of the next modification period).

If the first SI modification indication is set to a first value (e.g., 1) and the UE receives a second SI modification indication included in the short message (of a paging DCI), the UE may ignore the first SI modification indication. In this case, the UE may determine whether to apply an SI acquisition procedure (from the start of the next modification period) based on the second SI modification indication included in the short message (of a paging DCI).

Preferably, the UE may further determine whether to apply an SI acquisition procedure (from the start of the next modification period) based on a second SI modification indication included in the short message (of a paging DCI) if the first SI modification indication is set to a second value (e.g., 0), to indicate to the UE not to apply an SI acquisition procedure (from the start of the next modification period).

If the first SI modification indication is set to a second value (e.g., 0) and the UE receives a second SI modification indication included in the short message (of a paging DCI), the UE may ignore the first SI modification indication. In this case, the UE may determine whether to apply an SI acquisition procedure (from the start of the next modification period) based on the second SI modification indication included in the short message (of a paging DCI).

Preferably, the UE may further determine whether to apply an SI acquisition procedure (from the start of the next modification period) based on a second SI modification indication included in the short message (of a paging DCI) if the first SI modification indication is not included (or is absent) in the PEI.

Preferably, the UE may further determine whether to apply an SI acquisition procedure (from the start of the next modification period) based on a second SI modification indication included in the short message (of a paging DCI) if the first SI modification indication is set to a specific value (e.g., 1, or 0) in the PEI.

More specifically, a priority of the second SI modification indication included in the short message (of a paging DCI) may be higher than the first SI modification indication included in the PEI.

In some implementations, when the UE is configured with a PEI (and/or if the UE receives the PEI), the UE may determine whether to apply an SI acquisition procedure based on a first SI modification indication included in the PEI and the UE may expect a second SI modification indication included in the short message (of a paging DCI) to indicate the same information as the first SI modification indication included in the PEI.

In some examples, the NW may indicate, to the UE, the same information by the first SI modification indication included in the PEI as in the second SI modification indication.

In some examples, if information of the first SI modification indication included in the PEI is different from information of the second modification indication included in the short message (of a paging DCI), the UE may apply the second SI modification indication and may ignore the first SI modification indication.

In some examples, if information of the first SI modification indication included in the PEI is different from information of the second modification indication included in the short message (of a paging DCI), the UE may apply the first SI modification indication and may ignore the second SI modification indication.

In some implementations, when the UE receives a PEI that indicates an SI modification indication, the UE may determine whether to monitor the subsequent PO (to detect the paging DCI), to decode the short message indicator, to decode the short message, and/or to receive the paging message based on the SI modification indication included in the PEI.

In some examples, when the UE receives a PEI that indicates an SI modification indication and the SI modification indication is set to a first value (e.g., 1), the UE may or may not monitor the subsequent PO (to detect the paging DCI), to decode the short message indicator, to decode the short message, and/or to receive the paging message.

In some examples, when the UE receives the PEI that indicates an SI modification indication and the SI modification indication is set to a first value (e.g., 1), the UE may apply an SI acquisition procedure (from the start of the next modification period), and the UE may not monitor the subsequent PO (to detect the paging DCI), to decode the short message indicator, to decode the short message, and/or to receive the paging message.

In some examples, when the UE receives a PEI which indicates an SI modification indication and the SI modification indication is set to a second value (e.g., 0), the UE may not apply an SI acquisition procedure (from the start of the next modification period), and the UE may monitor the subsequent PO (to detect the paging DCI), to decode the short message indicator, to decode the short message, and/or to receive the paging message.

In some examples, when the UE receives a PEI and the SI modification indication is not included (or is absent) in the PEI, the UE may not apply an SI acquisition procedure (from the start of the next modification period), and the UE may monitor the subsequent PO (to detect the paging DCI), to decode the short message indicator, to decode the short message, and/or to receive the paging message.

ETWS/CMAS Indication

A PEI may include an ETWS/CMAS indication.

More specifically, the ETWS/CMAS indication may be used for the UE supporting ETWS/CMAS capability.

More specifically, the ETWS/CMAS indication may be used for the UE that is provided with searchSpaceSIB1 and searchSpaceOtherSystemInformation on the active BWP or the initial BWP.

When the UE receives an ETWS/CMAS indication included in a PEI, the UE may perform one or more of the following behaviors (but not limited to):
immediately re-acquire the SIB1;
acquire SIB6 (if the UE is ETWS-capable and si-SchedulingInfo includes scheduling information for SIB6);
acquire SIB7 (if the UE is ETWS-capable and si-SchedulingInfo includes scheduling information for SIB7); and
acquire SIB8 (if the UE is CMAS-capable and si-SchedulingInfo includes scheduling information for SIB8).

In some implementations, the UE may determine whether to immediately re-acquire the SIB1 and/or acquire SIB6/SIB7/SIB8 based on the ETWS/CMAS indication included in the PEI.

In some examples, when the UE receives a PEI, and if an ETWS/CMAS indication included in the PEI is set to a first value (e.g., 1), the UE may immediately re-acquire the SIB1 and/or acquire SIB6/SIB7/SIB8).

In some examples, when the UE receives a PEI, and if an ETWS/CMAS indication included in the PEI is set to a second value (e.g., 0), the UE may not immediately re-acquire the SIB1 and/or may not acquire SIB6/SIB7/SIB8.

The first value and the second value may be different.

In some examples, when the UE receives a PEI, and if an ETWS/CMAS indication is not included (e.g., is not present, is absent) in the PEI, the UE may not immediately re-acquire the SIB1 and/or may not acquire SIB6/SIB7/SIB8.

In some implementations, when the UE is configured with a PEI (and/or if the UE receives the PEI), the UE may determine whether to immediately re-acquire the SIB1 and/or acquire SIB6/SIB7/SIB8 based on a first ETWS/CMAS indication included in the PEI and may or may not determine whether to immediately re-acquire the SIB1 and/or acquire SIB6/SIB7/SIB8 based on a second ETWS/CMAS indication included in the short message (of a paging DCI). More specifically, when the UE receives a PEI, the PEI may indicate whether the UE needs to monitor the subsequent PO. If the PEI indicates to the UE to monitor the subsequent PO, the UE may receive a short message (of a paging DCI) on the subsequent PO.

In some examples, when the UE is configured with a PEI (and/or if the UE receives the PEI), the UE may determine whether to immediately re-acquire the SIB1 and/or acquire SIB6/SIB7/SIB8 based on an ETWS/CMAS indication included in the PEI. Then, when the UE receives a short message (of a paging DCI) (e.g., on the subsequent PO), the UE may ignore/skip a second ETWS/CMAS indication included in the short message (of a paging DCI).

Preferably, the UE may ignore/skip a second ETWS/CMAS indication included in the short message (of a paging DCI) if the first ETWS/CMAS indication is set to a first value (e.g., 1) to indicate to the UE to immediately re-acquire the SIB1 and/or acquire SIB6/SIB7/SIB8.

Preferably, the UE may ignore/skip a second ETWS/CMAS indication included in the short message (of a paging DCI) if the first ETWS/CMAS indication is set to a second value (e.g., 0) to indicate to the UE not to immediately re-acquire the SIB1 and/or acquire SIB6/SIB7/SIB8.

More specifically, a priority of the first ETWS/CMAS indication included in the PEI may be higher than the second ETWS/CMAS indication included in the short message (of a paging DCI).

In some examples, when the UE is configured with a PEI (and/or if the UE receives the PEI), the UE may determine whether to immediately re-acquire the SIB1 and/or acquire SIB6/SIB7/SIB8 based on an ETWS/CMAS indication included in the PEI. Then, when the UE receives a short message (of a paging DCI) (e.g., on the subsequent PO), the UE may determine a second ETWS/CMAS indication is not present (or is absent) in the short message (of a paging DCI).

Preferably, the UE may determine a second ETWS/CMAS indication is not present (or is absent) in the short message (of a paging DCI) if the first ETWS/CMAS indication is set to a first value (e.g., 1) to indicate to the UE to immediately re-acquire the SIB1 and/or acquire SIB6/SIB7/SIB8.

Preferably, the UE may determine a second ETWS/CMAS indication is not present (or is absent) in the short message (of a paging DCI) if the first ETWS/CMAS indication is set to a second value (e.g., 0) to indicate to the UE not to immediately re-acquire the SIB1 and/or acquire SIB6/SIB7/SIB8.

In some examples, when the UE is configured with a PEI (and/or if the UE receives the PEI), the UE may determine whether to immediately re-acquire the SIB1 and/or acquire SIB6/SIB7/SIB8 based on an ETWS/CMAS indication included in the PEI. Then, when the UE receives a short message (of a paging DCI) (e.g., on the subsequent PO), the UE may further determine whether to immediately re-acquire the SIB1 and/or acquire SIB6/SIB7/SIB8 based on a second ETWS/CMAS indication included in the short message (of a paging DCI).

In some examples, if the first ETWS/CMAS indication included in the PEI indicates to the UE to immediately re-acquire the SIB1 and/or acquire SIB6/SIB7/SIB8, but the second ETWS/CMAS indication included in the short message (of a paging DCI) indicates to the UE not to immediately re-acquire the SIB1 and/or acquire SIB6/SIB7/SIB8, the UE may follow (or replace with) the instruction from the second ETWS/CMAS indication. For example, the UE may not immediately re-acquire the SIB1 and/or acquire SIB6/SIB7/SIB8.

Preferably, the UE may further determine whether to immediately re-acquire the SIB1 and/or acquire SIB6/SIB7/SIB8 based on a second ETWS/CMAS indication included in the short message (of a paging DCI) if the first ETWS/CMAS indication is set to a first value (e.g., 1) to indicate to the UE to immediately re-acquire the SIB1 and/or acquire SIB6/SIB7/SIB8.

Preferably, the UE may further determine whether to immediately re-acquire the SIB1 and/or acquire SIB6/SIB7/SIB8 based on a second ETWS/CMAS indication included in the short message (of a paging DCI) if the first ETWS/CMAS indication is set to a second value (e.g., 0) to indicate to the UE not to immediately re-acquire the SIB1 and/or acquire SIB6/SIB7/SIB8.

Preferably, the UE may further determine whether to immediately re-acquire the SIB1 and/or acquire SIB6/SIB7/SIB8 based on a second ETWS/CMAS indication included in the short message (of a paging DCI) if the first ETWS/CMAS indication is not included (or is absent) in the PEI.

More specifically, a priority of the second ETWS/CMAS indication included in the short message (of a paging DCI) may be higher than the first ETWS/CMAS indication included in the PEI.

In some implementations, when the UE is configured with a PEI (and/or if the UE receives the PEI), the UE may determine whether to immediately re-acquire the SIB1 and/or acquire SIB6/SIB7/SIB8 based on a first ETWS/CMAS indication included in the PEI and the UE may expect that a second ETWS/CMAS indication included in the short message (of a paging DCI) indicates the same information as the first ETWS/CMAS indication included in the PEI.

In some examples, the NW may indicate, to the UE, the same information by the first ETWS/CMAS indication included in the PEI as in the second ETWS/CMAS indication.

In some examples, if information of the first ETWS/CMAS indication included in the PEI is different from information of the second ETWS/CMAS indication included in the short message (of a paging DCI), the UE may apply the second ETWS/CMAS indication and may ignore the first ETWS/CMAS indication.

In some examples, if information of the first ETWS/CMAS indication included in the PEI is different from information of the second ETWS/CMAS indication included in the short message (of a paging DCI), the UE may apply the first ETWS/CMAS indication and may ignore the second ETWS/CMAS indication.

In some implementations, when the UE receives a PEI which indicates an ETWS/CMAS indication, the UE may determine whether to monitor the subsequent PO (to detect the paging DCI), to decode the short message indicator, to decode the short message, and/or to receive the paging message, based on the ETWS/CMAS indication included in the PEI.

In some examples, when the UE receives the PEI which indicates an ETWS/CMAS indication and the ETWS/CMAS indication is set to a first value (e.g., 1), the UE may or may not monitor the subsequent PO (to detect the paging DCI), to decode the short message indicator, to decode the short message, and/or to receive the paging message.

In some examples, when the UE receives a PEI that indicates an ETWS/CMAS indication and the ETWS/CMAS indication is set to a first value (e.g., 1), the UE may immediately re-acquire the SIB1 and/or acquire SIB6/SIB7/SIB8, and the UE may not monitor the subsequent PO (to detect the paging DCI), to decode the short message indicator, to decode the short message, and/or to receive the paging message.

In some examples, when the UE receives a PEI that indicates an ETWS/CMAS indication and the ETWS/CMAS indication is set to a second value (e.g., 0), the UE may not immediately re-acquire the SIB1 and/or acquire SIB6/SIB7/SIB8, and the UE may monitor the subsequent PO (to detect the paging DCI), to decode the short message indicator, to decode the short message, and/or to receive the paging message.

In some examples, when the UE receives a PEI that implicitly indicates an ETWS/CMAS indication and the ETWS/CMAS indication is not explicitly included in the PEI, the UE may not immediately re-acquire the SIB1 and/or acquire SIB6/SIB7/SIB8, and the UE may monitor the subsequent PO (to detect the paging DCI), to decode the short message indicator, to decode the short message, and/or to receive the paging message.

PEI and Small Data Transmission (SDT)

The UE in RRC_INACTIVE/RRC_IDLE state may apply both the mechanism of the PEI and the mechanism of the SDT. The intention of the PEI is for power saving. For example, the UE in RRC_INACTIVE/RRC_IDLE state can reduce the monitoring of unnecessary paging monitoring/detection. The intention of the SDT is for providing a chance to a UE in RRC_INACTIVE state to transmit UL data without transitioning to RRC_CONNECTED state.

Configurations for PEI and SDT

In some implementations, the NW configures one or both of a PEI configuration and an SDT configuration to a UE (e.g., in RRC_INACTIVE/RRC_IDLE state).

In some examples, the NW may configure both a PEI configuration and an SDT configuration to a UE.

In some examples, the UE may apply both the PEI configuration and the SDT configuration at the same time.

In some implementations, the NW may only configure one of a PEI configuration and an SDT configuration to a UE (e.g., in RRC_INACTIVE/RRC_IDLE state).

In some examples, a priority of the SDT configuration may be higher than the PEI configuration.

In some examples, when the NW configures an SDT configuration to a UE, the NW may not configure a PEI configuration to the UE.

In some examples, when the UE is configured with an SDT configuration, the UE may not be configured with a PEI configuration.

In some examples, when the UE applies the SDT configuration, the UE may not apply the PEI configuration.

In some examples, a priority of the PEI configuration may be higher than the SDT configuration.

In some examples, when the NW configures a PEI configuration to a UE, the NW may not configure an SDT configuration to the UE and/or in the cell.

In some examples, when the UE is configured with the an configuration, the UE may not be configured with an SDT configuration.

In some examples, when the UE applies the PEI configuration, the UE may not apply the SDT configuration.

In some implementations, the NW may determine whether to configure the PEI and/or SDT based on UE capability and/or UE assistance information (e.g., when the UE is in RRC_INACTIVE/RRC_IDLE state). More specifically, the UE capability and/or the UE assistance information may be transmitted by the UE to the NW (e.g., when the UE is in RRC_CONNECTED, RRC_INACTIVE, and/or RRC_IDLE state).

In some examples, a UE may transmit a UE capability and/or a UE assistance information that indicates whether the UE supports the PEI, the SDT, and/or both.

In some examples, when the UE transmits a UE capability and/or a UE assistance information that indicates that the UE supports the PEI, the NW may configure a PEI configuration to the UE (and may not configure an SDT configuration to the UE). On the other hand, when the UE transmits a UE capability and/or a UE assistance information that indicates that the UE supports the PEI, the UE may apply an PEI configuration (and may not apply an SDT configuration).

In some examples, when the UE transmits a UE capability and/or a UE assistance information that indicates that the UE supports the SDT, the NW may configure an SDT configuration to the UE (and may not configure a PEI configuration to the UE). On the other hand, when the UE transmits a UE capability and/or a UE assistance information that indicates that the UE supports the SDT, the UE may apply the SDT configuration (and may not apply the PEI configuration).

In some examples, when the UE transmits a UE capability and/or a UE assistance information that indicates that the UE supports both the PEI and SDT, the NW may configure both an PEI configuration and an SDT configuration to the UE. On the other hand, when the UE transmits a UE capability and/or a UE assistance information that indicates that the UE supports both the PEI and SDT, the UE may apply both the PEI configuration and the SDT configuration.

PEI During SDT Procedure

In some implementations, a NW may configure one or both of a PEI configuration and an SDT configuration to a UE (e.g., in RRC_INACTIVE/RRC_IDLE state).

In some examples, the NW may configure both a PEI configuration and an SDT configuration to a UE.

In some examples, the UE may apply both the PEI configuration and the SDT configuration at the same time.

In some implementations, the UE may initiate an SDT procedure (e.g., when the UE is in RRC_INACTIVE/RRC_IDLE state) when the criteria of the SDT initiation are satisfied. After the UE initiates the SDT procedure, the UE may determine whether to monitor the PEI (e.g., on an SS/PDCCH for the PEI) during the SDT procedure. More specifically, the SDT procedure may be Random Access (RA) SDT (RA-SDT) and/or Configured Grant (CG) SDT (CG-SDT).

In some examples, the UE may determine whether to monitor the PEI (e.g., on a SS/PDCCH for PEI) during the SDT procedure based on a configuration/IE received from the NW.

In some examples, if the configuration/information element (IE) indicates a first value, the UE may monitor the PEI (e.g., on an SS/PDCCH for PEI) during the SDT procedure.

In some examples, if the configuration/IE indicates a second value, the UE may not monitor the PEI (e.g., on an SS/PDCCH for PEI) during the SDT procedure.

More specifically, the configuration/IE may include one bit to indicate to the UE to enable/disable monitoring of the PEI.

More specifically, the configuration/IE may be configured in the PEI configuration and/or the SDT configuration. More specifically, the configuration/IE may be configured by system information (e.g., SIB1 or "other SI"). More specifically, the configuration/IE may be configured by an RRC release message (e.g., with or without suspend configuration)

It is noted that the configuration/IE may be included in an RRC message.

In some examples, the UE may monitor the PEI (e.g., on an SS/PDCCH for PEI) during the SDT procedure.

In some examples, the UE may monitor the PEI during the SDT procedure, before and/or within a subsequent transmission period.

In some examples, the UE may monitor the PEI during the SDT procedure, before and/or after an RA procedure (for SDT) is (successfully) completed.

The UE may determine/consider the RA procedure is successfully completed if the UE determines that the contention resolution of the RA procedure is successful.

In some examples, the UE may monitor the PEI during the SDT procedure, before or after the UE receives a response from a NW.

In some examples, the response may be a Msg2/Msg4/MsgB.

In some examples, the response may be used for contention resolution for an RA-SDT procedure.

In some examples, the response may be a feedback for a (first/initial) UL transmission via the CG resource (in a CG-SDT procedure). The response/feedback may include an Hybrid Automatic Repeat reQuest (HARQ) Acknowledge (ACK)/Non-Acknowledge (NACK) message, and/or Downlink Feedback Information (DFI) (e.g., for (the first) UL transmission via the CG resource). The response may indicate a UL grant for a new transmission for the HARQ process used for the transmission of a (first/initial) UL transmission (e.g., via the CG resource in a CG-SDT procedure).

In some examples, the response may be a PDCCH addressed to an RNTI (e.g., a Cell-Radio Network Temporary Identifier (C-RNTI), a Configured Scheduling RNTI (CS-RNTI), a dedicated RNTI, an RNTI for SDT, and/or an RNTI for CG).

In some examples, the response may include RRCResume, RRCSetup, RRCRelease, RRCRelease with SuspendConfig, RRCReestablishment, RRCReconfiguration, and/or RRCReject, etc.

In some examples, the UE may monitor a PEI during the SDT procedure, if a timer/window (e.g., for SDT) is not running.

In some examples, the timer/window may be a CG-SDT response timer/window.

In some examples, the timer/window may be used for monitoring PDCCH for a response/feedback (e.g., including ACK/NACK/DFI).

In some examples, the timer/window may be used for monitoring PDCCH for new transmission/retransmission scheduling from a NW.

In some examples, the timer/window may be ra-ResponseWindow, msgB-ResponseWindow, ra-ContentionResolutionTimer, configuredGrantTimer, cg-RetransmissionTimer, drx-onDurationTimer, drx-InactivityTimer, drx-RetransmissionTimerDL, and/or drx-RetransmissionTimerUL.

In some examples, the timer/window may be an SDT failure detection timer. The timer/window may be T300, T301, T302, T304, T310, T311, T312, T316, T319, T320, T321, T322, T325, T330, T331, T342, and/or T345.

In some examples, the timer/window may be a TA timer and/or an SDT TA timer.

In some examples, the UE may monitor a PEI during the SDT procedure if the SDT procedure is a CG-SDT procedure. In some examples, the UE may monitor a PEI during the SDT procedure if the SDT procedure is an RA-SDT procedure.

In some examples, the UE may not monitor a PEI (e.g., on an SS/PDCCH for PEI) during the SDT procedure. Preferably, the UE not monitoring a PEI (e.g., on an SS/PDCCH for PEI) may imply that the UE skips/ignores monitoring a PEI (e.g., on an SS/PDCCH for PEI).

In some examples, the UE may not monitor a PEI during the SDT procedure, before or after entering a subsequent transmission period.

In some examples, the UE may not monitor a PEI during the SDT procedure, while the UE is performing an RA procedure (for SDT).

In some examples, the UE may not monitor a PEI during the SDT procedure, before or after the UE transmits a UL message.

The UL message may be transmitted via Msg1/Msg3/MsgA/CG resource/UL resource scheduled by Msg2/MsgB/Msg4 (during the SDT procedure).

The UL message may include an RRC resume request message (e.g., RRCResumeRequest or RRCResumeRequest1).

The UL message may include small data (e.g., UL data associated with a specific Signaling Radio Bearer (SRB)/Data Radio Bearer (DRB)/Logical Channel (LCH) for SDT).

The UL message may include a MAC Control Element (CE) (e.g., Buffer Status Report (BSR) MAC CE).

If the UL message is (re-)transmitted based on a CG resource/configuration, the timer/window that corresponds to the CG configuration may be (re-)started.

If the UL message is transmitted on a UL resource scheduled by a dynamic grant, and the dynamic grant is used for retransmission of a HARQ process used for transmitting UL data via a CG resource, the timer/window that corresponds to the CG configuration may be (re-)started.

In some examples, the UE may not monitor a PEI during the SDT procedure, before or after the UE receives a response from NW.

In some examples, the response may be a Msg2/Msg4/MsgB. The response may be used for contention resolution for an RA-SDT procedure.

In some examples, the response may be a feedback for a (first/initial) UL transmission via the CG resource (in a CG-SDT procedure). The response/feedback may include an (HARQ) ACK/NACK message, and/or DFI (e.g., for (the first) UL transmission via the CG resource). The response may indicate a UL grant for a new transmission for the HARQ process used for the transmission of a (first/initial) UL transmission (e.g., via the CG resource in a CG-SDT procedure).

In some examples, the response may be a PDCCH addressed to an RNTI (e.g., a C-RNTI, a CS-RNTI, a dedicated RNTI, an RNTI for SDT, and/or an RNTI for CG).

In some examples, the response may include RRCResume, RRCSetup, RRCRelease, RRCRelease with SuspendConfig, RRCReestablishment, RRCReconfiguration, and/or RRCReject, etc.

In some examples, the UE may not monitor a PEI during the SDT procedure, if a timer/window (e.g., for SDT) is running.

In some examples, the timer/window may be CG-SDT response timer/window.

In some examples, the timer/window may be used for monitoring PDCCH for a response/feedback (e.g., including ACKNACK/DFI).

In some examples, the timer/window may be used for monitoring PDCCH for new transmission/retransmission scheduling from a NW.

In some examples, the timer/window may be ra-ResponseWindow, msgB-ResponseWindow, ra-ContentionResolutionTimer, configuredGrantTimer, cg-RetransmissionTimer, drx-onDurationTimer, drx-InactivityTimer, drx-RetransmissionTimerDL, and/or drx-RetransmissionTimerUL.

In some examples, the timer/window may be an SDT failure detection timer. The timer/window may be T300, T301, T302, T304, T310, T311, T312, T316, T319, T320, T321, T322, T325, T330, T331, T342, and/or T345.

In some examples, the timer/window may be an TA timer and/or an SDT TA timer.

In some examples, the UE may not monitor a PEI during the SDT procedure if the SDT procedure is a CG-SDT procedure. In some examples, the UE may not monitor a PEI during the SDT procedure if the SDT procedure is an RA-SDT procedure.

In some implementations, the UE may determine whether to monitor/detect/receive paging (e.g., paging DCI, short message indicator, short message, and/or paging message) during an SDT procedure (e.g., in a case that the UE is configured with a PEI (and/or if the PEI includes an SI modification and/or an ETWS/CMAS indication)).

In some examples, in a case that the UE is configured with a PEI (and/or if the PEI includes an SI modification and/or an ETWS/CMAS indication), the UE may not monitor/detect/receive paging (e.g., paging DCI, short message indicator, short message, and/or paging message) during an SDT procedure.

Preferably, the UE not monitoring/detecting/receiving paging (e.g., paging DCI, short message indicator, short message, and/or paging message) may imply that the UE skips/ignores monitoring/detecting/receiving paging (e.g., paging DCI, short message indicator, short message, and/or paging message).

eSIB1 searchSpaceOtherSystemInformation, paging-SearchSpace, ra-SearchSpace, firstPDCCH-MonitoringOccasionOfPO, and/or commonSearchSpaceListExt-r16, etc.

TABLE 3

PDCCH-ConfigCommon information element

| | | |
|---|---|---|
| PDCCH-ConfigCommon := | SEQUENCE { | |
|   controlResourceSetZero | ControlResourceSetZero | OPTIONAL, -- Cond InitialBWP-Only |
|   commonControlResourceSet | ControlResourceSet | OPTIONAL, -- Need R |
|   searchSpaceZero | SearchSpaceZer | OPTIONAL, -- Cond InitialBWP-Only |
|   commonSearchSpaceList | SEQUENCE (SIZE(1..4)) OF SearchSpace | OPTIONAL, -- NeedR |
|   searchSpaceSIB1 | SearchSpaceId | OPTIONAL, -- NeedS |
|   searchSpaceOtherSystemInformation | SearchSpaceId | OPTIONAL, -- NeedS |
|   pagingSearchSpace | SearchSpaceId | OPTIONAL, -- NeedS |
|   ra-SearchSpaceSearch | SpaceId | OPTIONAL, -- Need S |
|   ..., | | |
|   [[ | | |
|   firstPDCCH-MonitoringOccasionOfPO | CHOICE { | |
|   ... | | |
|   commonSearchSpaceListExt-r16 | SEQUENCE (SIZE(1..4)) OF SearchSpaceExt-r16 | OPTIONAL -- NeedR |
|   ]] | | |
| } | | |

In some examples, in a case that the UE is configured with a PEI, but the PEI does not include an SI modification and/or an ETWS/CMAS indication, the UE may monitor/detect/receive paging (e.g., paging DCI, short message indicator, short message, and/or paging message) during an SDT procedure.

In some examples, in a case that the UE is not configured with a PEI, the UE may monitor/detect/receive paging (e.g., paging DCI, short message indicator, short message, and/or paging message) during an SDT procedure.

Collision of SS for PEI and SS for SDT/Others

The UE (e.g., in RRC_INACTIVE/RRC_IDLE state) may be configured with different PDCCH monitoring occasions for different purposes (e.g., for a PEI, for SDT, for paging DCI/short message, for system information, for RA). The PDCCH monitoring occasions may be determined by SSs, CORESETs, and/or some parameters.

1. For Paging DCI/Short Message

The PDCCH monitoring occasions for paging (e.g., paging occasion) may be determined according to paging-SearchSpace (as specified in 3GPP TS 38.213) and firstPDCCH-MonitoringOccasionOfPO and nrofPDCCH-MonitoringOccasionPerSSB-InPO, if configured (as specified in 3GPP TS 38.331).

Specifically, the UE may monitor PDCCH for an SI change indication and/or a PWS notification (e.g., ETWS or CMAS) based on the paging occasion.

2. For System Information

For SIB1, the PDCCH monitoring occasion(s) may be determined according to searchSpaceSIB1.

For other SI and/or SI message acquisition, the PDCCH monitoring occasion(s) may be determined according to searchSpaceOtherSystemInformation and/or searchSpaceSIB1.

3. For RA ra-SearchSpace may be configured for monitoring PDCCH for an RA procedure (e.g., for monitoring Random Access Response (RAR)).

The configurations of PDCCH monitoring occasions for the UE to monitor (e.g., when the UE is in RRC_INACTIVE state) may be included in PDCCH-ConfigCommon IE (e.g., as shown in Table 3). The configurations may be controlResourceSetZero, commonControlResourceSet, searchSpaceZero, commonSearchSpaceList, searchSpac- Based on 3GPP TS 38.213, a set of PDCCH candidates for a UE to monitor may be defined in terms of PDCCH search space sets. A search space set can be a CSS set or a UE-specific Search Space (USS) set. A UE may monitor PDCCH candidates in one or more of the following search spaces sets:

- a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by an SI-RNTI on the primary cell of the MCG;
- a Type0A-PDCCH CSS set configured by searchSpaceOtherSystemInformation in PDCCH-ConfigCommon for a DCI format with CRC scrambled by an SI-RNTI on the primary cell of the MCG;
- a Type1-PDCCH CSS set configured by ra-SearchSpace in PDCCH-ConfigCommon for a DCI format with CRC scrambled by an RA-RNTI, a MsgB-RNTI, or a TC-RNTI on the primary cell;
- a Type2-PDCCH CSS set configured by paging-SearchSpace in PDCCH-ConfigCommon for a DCI format with CRC scrambled by a P-RNTI on the primary cell of the MCG;
- a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, or CI-RNTI and, only for the primary cell, C-RNTI, MCS-C-RNTI, CS-RNTI(s), or PS-RNTI; and/or
- a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL Semi-Persistent Scheduling V-RNTI.

For a PEI, a UE (e.g., in RRC_INACTIVE/RRC_IDLE state) may be configured with one or more SSs for PDCCH monitoring.

The SS for PEI may be used for monitoring the PDCCH to detect the PEI (e.g., before a PO).

The SS for PEI may be configured in a PEI configuration.

The SS for PEI may be configured by an RRC release message (with or without suspend configuration) and/or by system information (e.g., SIB1 or "other SI").

The SS for PEI may be the common search space(s) configured in PDCCH-ConfigCommon, the type-1 PDCCH CSS set configured by ra-SearchSpace, the type-3 PDCCH CSS set, search space zero, a new common search space set configured via system information (e.g., SIB) or an RRC release message, search space with parameters of the search space(s) configured in the initial BWP, pagingsearchspace, searchspaceSIB1, etc.

For an SDT, a UE (e.g., in RRC_INACTIVE/RRC_IDLE state) may be configured with one or more SSs for PDCCH monitoring (e.g., during an SDT procedure).

The SS for SDT may be configured for CG-SDT.

The SS for SDT may be configured in a CG configuration for SDT and/or in an SDT configuration.

The SS for SDT may be configured for RA-SDT.

The SS for SDT may be configured in an RA configuration for SDT and/or in an SDT configuration.

The SS for SDT may be configured by an RRC release message (with or without suspend configuration) and/or by system information (e.g., SIB1 or "other SI").

The SS for SDT may be used for monitoring the PDCCH to receive a Msg2/MsgB/Msg4 during an RA-SDT procedure.

The SS for SDT may be used for monitoring the PDCCH for a response/feedback/scheduling from the NW for a CG-SDT procedure and/or an RA-SDT procedure.

The SS for SDT may be used for monitoring the PDCCH while a timer/window is running.

The timer/window may be CG-SDT response timer/window,

The timer/window may be used for monitoring PDCCH for a response/feedback (e.g., including ACK/NACK/DFI).

The timer/window may be used for monitoring PDCCH for new transmission/retransmission scheduling from NW.

The timer/window may be ra-ResponseWindow, msgB-ResponseWindow, ra-ContentionResolutionTimer, configuredGrantTimer, cg-RetransmissionTimer, drx-onDurationTimer, drx-InactivityTimer, drx-RetransmissionTimerDL, and/or drx-RetransmissionTimerUL.

The timer/window may be an SDT failure detection timer.

The timer/window may be T300, T301, T302, T304, T310, T311, T312, T316, T319, T320, T321, T322, T325, T330, T331, T342, and/or T345.

The timer/window may be an TA timer and/or an SDT TA timer.

The SS for SDT may be a common SS (e.g., the type-1 PDCCH CSS configured by ra-SearchSpace, the type-3 PDCCH CSS, and/or a new common SS configured from system information/RRC release message). The SS for SDT may be a UE-specific SS (e.g., a UE-specific SS configured from an RRC Release message, and/or a UE-specific SS configured from Msg4/MsgB).

Figure 10:
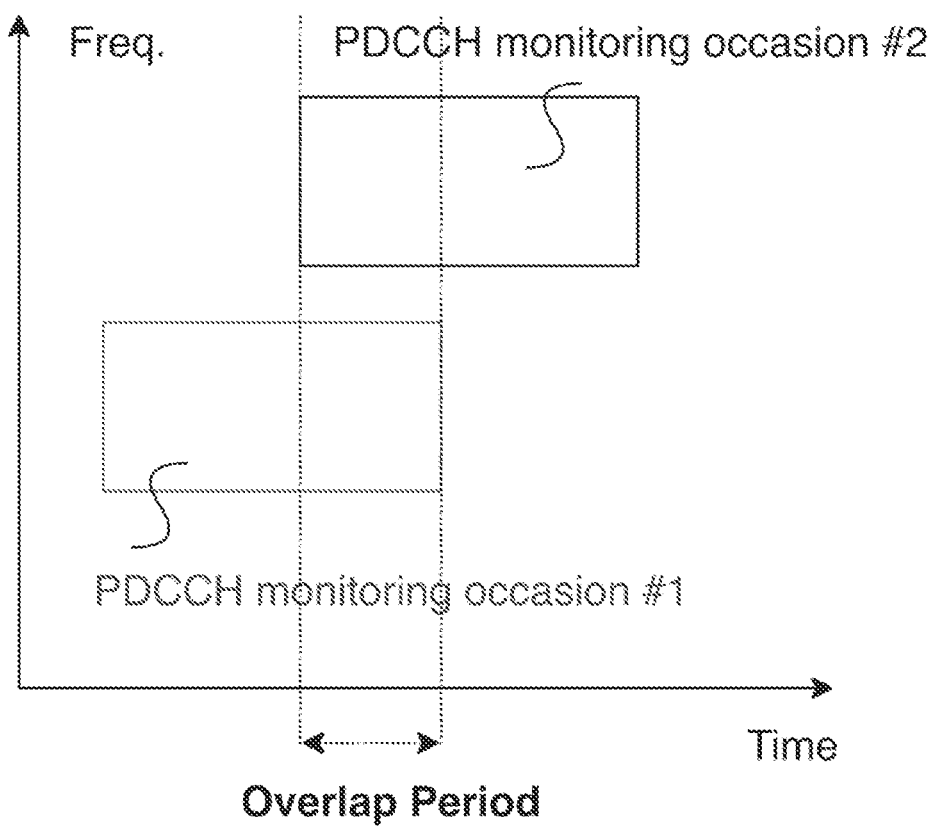
FIG. 10 is a timing diagram illustrating Physical Downlink Control Channel (PDCCH) monitoring occasions overlapping, according to an implementation of the present disclosure.

In some examples, different PDCCH monitoring occasions partially/fully overlapped/collided in time domain (e.g., in the same symbol, slot, subframe, system frame, etc.) and/or in frequency domain. FIG. 10 is a timing diagram illustrating PDCCH monitoring occasions overlapping, according to an implementation of the present disclosure. An example as shown in FIG. 10, an overlap period, in time domain, is occurring between a first PDCCH monitoring occasion (e.g., PDCCH monitoring occasion #1) and a second PDCCH monitoring occasion (e.g., PDCCH monitoring occasion #2). More specifically, the first PDCCH monitoring occasion may be configured for SDT. More specifically, the second PDCCH monitoring occasion may be configured for other purposes (e.g., for paging/short message, for system information, for RA, etc.). Within this overlap period, the UE may not be able to monitor both the first PDCCH monitoring occasion and the second PDCCH monitoring occasion at the same time (due to UE capability). In order to resolve this issue, some methods are disclosed as follows.

When a UE is configured with at least two PDCCH monitoring occasions, a first PDCCH candidate monitored in a first PDCCH monitoring occasion may be configured for PEI purposes, and a second PDCCH candidate monitored in a second PDCCH monitoring occasion may be configured for other purposes (e.g., for SDT, paging/short message, for system information, for RA, etc.)

In some examples, a first PDCCH monitoring occasion (e.g., for a PEI) may be configured by a first SS and/or a first CORESET.

The first SS may be the common search space(s) configured in PDCCH-ConfigCommon, the type-1 PDCCH CSS set configured by ra-SearchSpace, the type-3 PDCCH CSS set, search space zero, a new common search space set configured via system information (e.g., SIB) or an RRC release message, search space with parameters of the search space(s) configured in the initial BWP, pagingsearchspace, searchspaceSIB1, etc.

The first SS may be a common SS (e.g., the type-1 PDCCH CSS configured by ra-SearchSpace, the type-3 PDCCH CSS, and/or a new common SS configured from system information/RRC release message).

The first SS may be a UE-specific SS (e.g., a UE-specific SS configured from an RRC Release message, and/or a UE-specific SS configured from Msg4/MsgB).

The first SS may be a (UE-specific) search space set configured via configuration(s) for SDT.

The first SS may be a search space set identified as a specific set for SDT.

The first CORSET may be a common CORESET (e.g., CORESET 0, commonControlResourceSet).

In some examples, a second PDCCH monitoring occasion (e.g., for SDT, paging/short message, for system information, for RA, etc.) may be configured by a second SS and/or a second CORESET.

The second SS may be searchSpaceZero, commonSearchSpaceList, searchSpaceSIB1, searchSpaceOtherSystemInformation, pagingSearchSpace, ra-SearchSpace, commonSearchSpaceListExt-r16, and/or etc.

In some implementations, the UE may not expect to be configured/provided (by NW) with the first PDCCH monitoring occasion and the second PDCCH monitoring occasion that are partially/fully overlapped in time domain (e.g., in the same symbol, slot, subframe, system frame, etc.) and/or frequency domain. In other words, the NW may not configure the UE with the first PDCCH monitoring occasion and the second PDCCH monitoring occasion that are partially/fully overlapped in time domain (e.g., in the same symbol, slot, subframe, system frame, etc.) and/or frequency domain.

In some implementations, the UE may not expect to monitor the first PDCCH monitoring occasion and the second PDCCH monitoring occasion at the same time. For example, the network may not configure first PDCCH monitoring occasion and second PDCCH monitoring occasion that fully/partially overlap in the time domain.

In some implementations, in a case that the first PDCCH monitoring occasion and the second PDCCH monitoring occasion partially/fully overlap/collide (e.g., in the same symbol, slot, subframe, system frame, etc.), the UE may select/prioritize one of the first PDCCH monitoring occasion and the second PDCCH monitoring occasion to monitor.

In some examples, the UE may select/prioritize the first PDCCH monitoring occasion. For example, in a case that the first PDCCH monitoring occasion and the second PDCCH monitoring occasion partially/fully overlap/collide (e.g., in the same symbol, slot, subframe, system frame, etc.), the UE may monitor the first PDCCH monitoring occasion. More specifically, the UE may not monitor the second PDCCH monitoring occasion.

In some examples, the UE may select/prioritize the second PDCCH monitoring occasion. For example, in a case that the first PDCCH monitoring occasion and the second PDCCH monitoring occasion partially/fully overlap/collide (e.g., in the same symbol, slot, subframe, system frame, etc.), the UE may monitor the second PDCCH monitoring occasion. More specifically, the UE may not monitor the first PDCCH monitoring occasion.

In some implementations, in a case that the first PDCCH monitoring occasion and the second PDCCH monitoring occasion partially/fully overlap/collide (e.g., in the same symbol, slot, subframe, system frame, etc.), a PDCCH monitoring occasion that should be selected/prioritized (by the UE) to monitor may be configured by NW (e.g., via a configuration/IE).

Specifically, if the UE is configured with a configuration/IE that indicates a first value, the UE may select/prioritize the first PDCCH monitoring occasion. For example, the UE may monitor the first PDCCH monitoring occasion. More specifically, the UE may not monitor the second PDCCH monitoring occasion.

Specifically, if the UE is configured with a configuration/IE that indicates a second value, the UE may select/prioritize the second PDCCH monitoring occasion. For example, the UE may monitor the second PDCCH monitoring occasion. More specifically, the UE may not monitor the first PDCCH monitoring occasion.

In some implementations, in a case that the maximum number of non-overlapped CCEs per slot or/and maximum number of monitored PDCCH candidates per slot (for UE in RRC_INACTIVE/RRC_IDLE state) is determined:

In some examples, the first PDCCH candidate may be allocated before the second PDCCH candidate.

In some examples, if the DCI formats associated with the first PDCCH candidate and the DCI formats associated with the second PDCCH candidate have the same size, the UE may receive the first PDCCH candidate and the second PDCCH candidate over the same set of CCEs, or/and the first PDCCH candidate and the second PDCCH candidate have identical scrambling, the UE may monitor the first PDCCH candidate only.

In some examples, the first PDCCH candidate may always correspond to the lowest SS ID.

Figure 11:
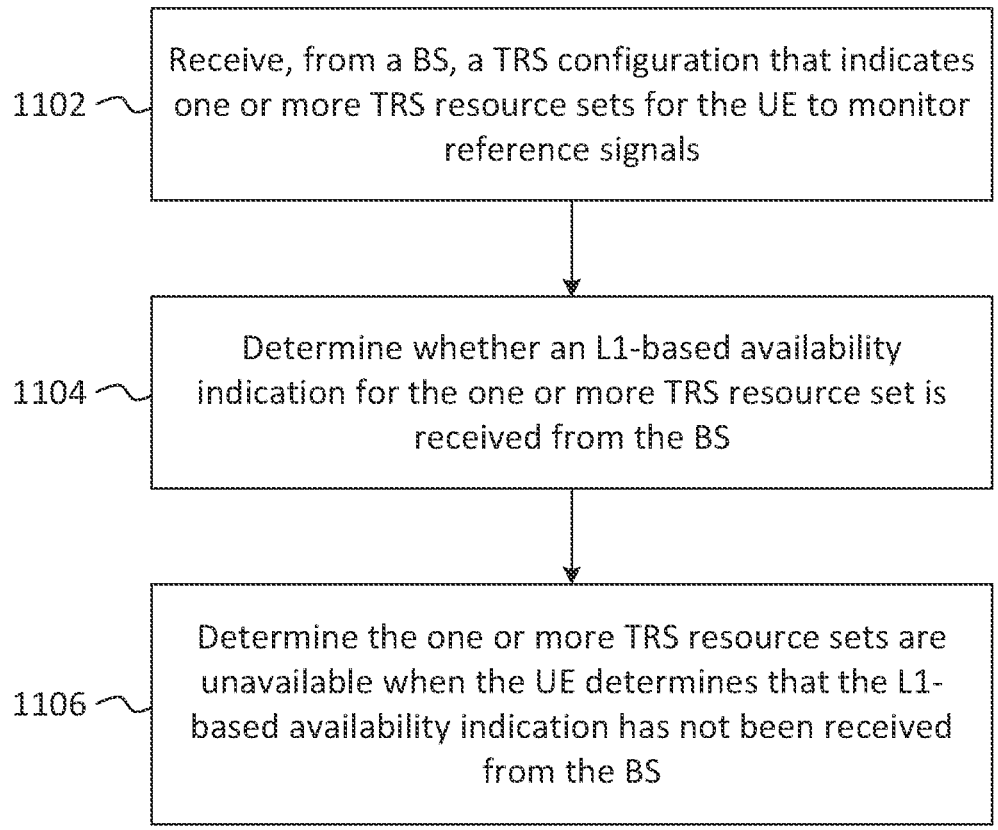
FIG. 11 is a flowchart illustrating a method/process for monitoring a TRS, according to an implementation of the present disclosure.

FIG. 11 is a flowchart illustrating a method/process 1100 for monitoring a TRS, according to an implementation of the present disclosure. In action 1102, the UE receives, from a BS, a TRS configuration that indicates one or more TRS resource sets for the UE to monitor reference signals. In action 1104, the UE determines whether an L1-based availability indication (e.g., TRS/CSI-RS availability indication) for the one or more TRS resource sets is received from the BS. In action 1106, the UE determines the one or more TRS resource sets are unavailable when the UE determines that the L1-based availability indication has not been received from the BS.

In some examples, the UE further determines the one or more TRS resource sets are present when the UE determines that the L1-based availability indication has been received from the BS and the L1-based availability indication indicates a first value for the one or more TRS resource sets.

In some examples, the UE further determines the one or more TRS resource sets are present for a number of frames based on at least a validity duration and a paging cycle.

In some examples, the validity duration is configured by the BS via a SIB.

In some examples, a TRS resource of the one or more TRS resource sets includes a CSI-RS resource.

In some examples, the L1-based availability indication includes a bitmap, each bit of the bitmap being associated with at least one corresponding TRS resource set of the one or more TRS resource sets.

In some examples, the L1-based availability indication is indicated by the BS via a TRS availability indication included in DCI format 1_0 with a CRC scrambled by a P-RNTI.

In some examples, the L1-based availability indication is indicated by the BS via a PEI. The PEI is monitored by the UE on a PEI search space.

In some examples, the TRS configuration is configured by the BS via a SIB.

In some examples, the UE is in an RRC_IDLE state or an RRC_INACTIVE state.

Figure 12:
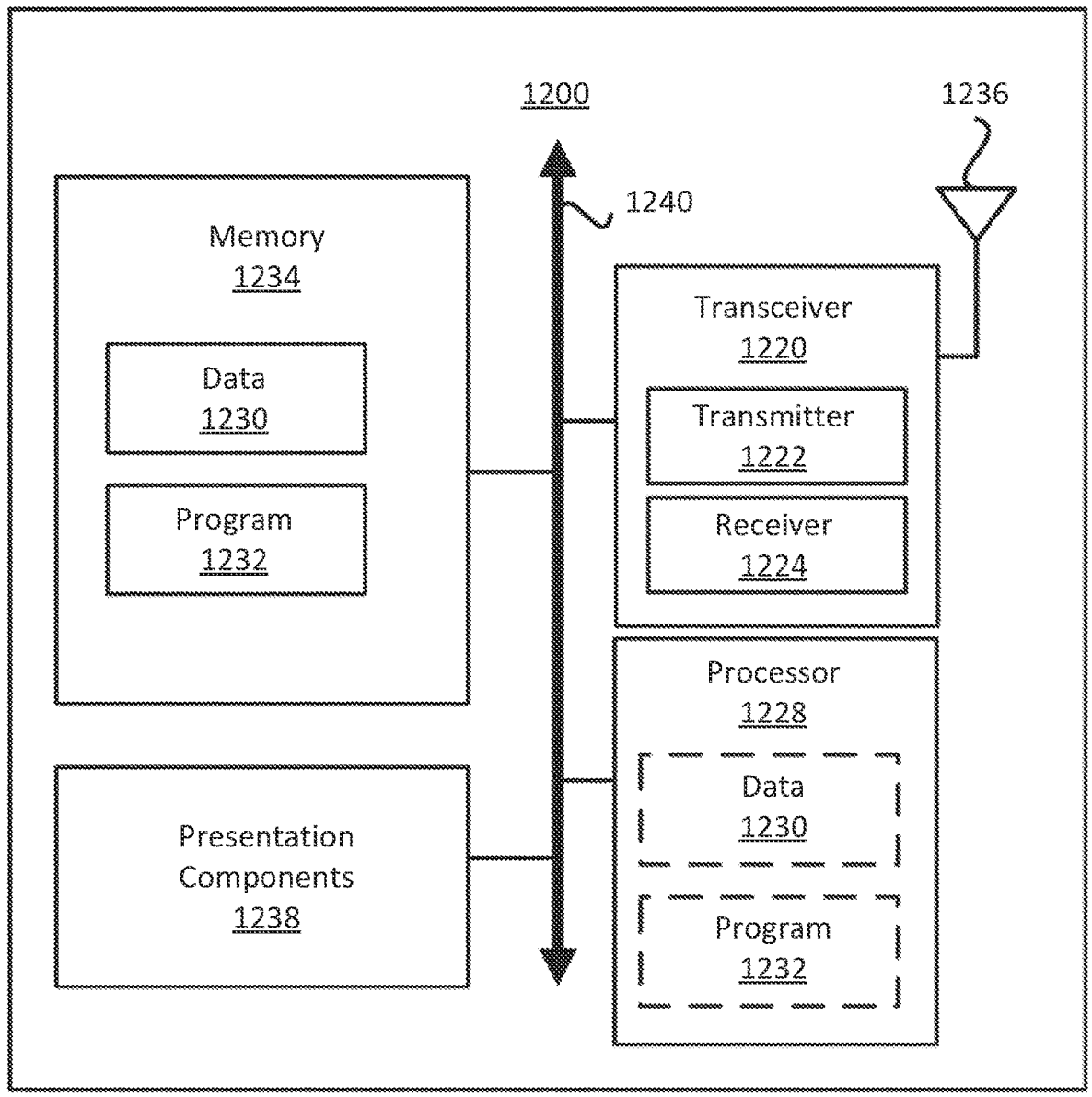
FIG. 12 is a block diagram illustrating a node for wireless communication, according to an implementation of the present disclosure.

FIG. 12 is a block diagram illustrating a node 1200 for wireless communication, according to an implementation of the present disclosure.

As illustrated in FIG. 12, the node 1200 may include a transceiver 1220, a processor 1228, a memory 1234, one or more presentation components 1238, and at least one antenna 1236. The node 1200 may also include a Radio Frequency (RF) spectrum band module, a BS communications module, a network communications module, a system communications management module, input/output (I/O) ports, I/O components, and a power supply (not illustrated in FIG. 12).

Each of these components may be in communication with each other, directly or indirectly, over one or more buses 1240. The node 1200 may be a UE or a BS that performs various disclosed functions illustrated in FIG. 11 and examples/implementations in this disclosure.

The transceiver 1220 may include a transmitter 1222 (with transmitting circuitry) and a receiver 1224 (with receiving circuitry) and may be configured to transmit and/or receive time and/or frequency resource partitioning information. The transceiver 1220 may be configured to transmit in different types of subframes and slots including, but not limited to, usable, non-usable, and flexibly usable subframes and slot formats. The transceiver 1220 may be configured to receive data and control channels.

The node 1200 may include a variety of computer-readable media. Computer-readable media may be any media that can be accessed by the node 1200 and include both volatile (and non-volatile) media and removable (and non-removable) media. Computer-readable media may include computer storage media and communication media. Computer storage media may include both volatile (and/or non-volatile), as well as removable (and/or non-removable), media implemented according to any method or technology for storage of information such as computer-readable media. Computer storage media may include RAM, ROM, EPROM, EEPROM, flash memory (or other memory technology), CD-ROM, Digital Versatile Disk (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal, such as a carrier wave, or other transport mechanisms and include any information delivery media. The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the disclosed media should be included within the scope of computer-readable media.

The memory 1234 may include computer-storage media in the form of volatile and/or non-volatile memory. The memory 1234 may be removable, non-removable, or a combination thereof. For example, the memory 1234 may include solid-state memory, hard drives, optical-disc drives, etc. As illustrated in FIG. 12, the memory 1234 may store computer-readable and/or computer-executable instructions 1232 (e.g., software codes) that are configured to, when executed, cause the processor 1228 (e.g., processing circuitry) to perform various disclosed functions. Alternatively, the instructions 1232 may not be directly executable by the processor 1228 but may be configured to cause the node 1200 (e.g., when compiled and executed) to perform various disclosed functions.

The processor 1228 may include an intelligent hardware device, a central processing unit (CPU), a microcontroller, an ASIC, etc. The processor 1228 may include memory. The processor 1228 may process the data 1230 and the instructions 1232 received from the memory 1234, and information received through the transceiver 1220, the baseband communications module, and/or the network communications module. The processor 1226 may also process information sent to the transceiver 1220 for transmission via the antenna 1236, and/or to the network communications module for transmission to a CN.

One or more presentation components 1238 may present data to a person or other devices. Presentation components 1238 may include a display device, a speaker, a printing component, a vibrating component, etc.

Paging Mechanism
Paging by DRX

In some implementations, paging allows the network to reach UEs in RRC_IDLE and in RRC_INACTIVE state through Paging messages, and to notify UEs in RRC_IDLE, RRC_INACTIVE and RRC_CONNECTED state of system information change and ETWS/CMAS indications through Short Messages. Both Paging messages and Short Messages are addressed with P-RNTI on PDCCH, but when the former is sent on PCCH, the latter is sent over PDCCH directly.

The UE in RRC_IDLE state monitors the paging channels for CN-initiated paging, while the UE in RRC_INACTIVE state monitors paging channels for RAN-initiated paging. A UE does not monitor paging channels continuously during a paging DRX. Paging DRX is applied for the UE in RRC_IDLE state or RRC_INACTIVE state, and thus the UE is only required to monitor paging channels during one Paging Occasion (PO) per DRX cycle (defined in 3GPP TS 38.304). Paging DRX cycles are configured by the network via the following methods:

For CN-initiated paging, a default cycle is broadcast in system information;

For CN-initiated paging, a UE-specific cycle can be configured via NAS signaling;

For RAN-initiated paging, a UE-specific cycle is configured via RRC signaling.

The UE uses the shortest of the DRX cycles applicable. For example, a UE in RRC_IDLE state uses the shortest of the first two cycles above, while a UE in RRC_INACTIVE state uses the shortest of the three.

The POs of a UE for CN-initiated and RAN-initiated paging are based on the same UE_ID, resulting in overlapping POs for both. The number of different POs in a DRX cycle is configurable via system information and a network may distribute UEs to those POs based on their IDs.

The UE in RRC_CONNECTED monitors the paging channels in any PO signaled in system information for an SI change indication and PWS notification. In case of BA, a UE in RRC_CONNECTED state may monitor paging channels on an active BWP with a common search space.

For an operation with shared spectrum channel access, a UE can be configured for an additional number of PDCCH monitoring occasions in a PO to monitor for a paging. However, when the UE detects a PDCCH transmission within the UE's PO addressed with P-RNTI, the UE is not required to monitor the subsequent PDCCH monitoring occasions within this PO.

The UE may apply a DRX mechanism in RRC_IDLE and RRC_INACTIVE state in order to reduce power consumption. The UE monitors one PO per DRX cycle. A PO is a set of PDCCH monitoring occasions and can include multiple time slots (e.g. subframe or OFDM symbol) where paging DCI can be sent (defined in 3GPP TS 38.213). One PF is one Radio Frame and may include one or multiple PO(s) or starting point of a PO.

In multi-beam operations, the UE determines that the same paging message and the same Short Message are repeated in all transmitted beams, and thus the selection of the beam(s) for the reception of the paging message and Short Message is up to UE implementation. The paging message is the same for both RAN-initiated paging and CN-initiated paging.

The UE initiates a RRC Connection Resume procedure when receiving a RAN-initiated paging. If the UE receives a CN-initiated paging in RRC_INACTIVE state, the UE moves to RRC_IDLE state and informs the NAS layer.

Paging Monitoring Occasions (for a Paging DCI) Determination

The PF and PO for paging are determined by the following formulae:

SFN for the PF is determined by:

$$(SFN+PF\_offset) \bmod T = (T \operatorname{div} N)*(UE\_ID \bmod N).$$

Index (i_s), indicating the index of the PO is determined by:

$$i\_s = \operatorname{floor}(UE\_ID/N) \bmod Ns.$$

The PDCCH monitoring occasions for paging are determined according to pagingSearchSpace, as specified in 3GPP TS 38.213 and firstPDCCH-MonitoringOccasionOfPO and nrofPDCCH-MonitoringOccasionPerSSB-InPO, if configured, as specified in 3GPP TS 38.331. When SearchSpaceId=0 is configured for pagingSearchSpace, the PDCCH monitoring occasions for paging are the same as for RMSI, as defined in 3GPP TS 38.213.

When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (i_s+1)th PO. A PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The [x*S+K]th PDCCH monitoring occasion for paging in the PO corresponds to the Kth transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of the (i_s+1)th PO is the (i_s+1)th value of the firstPDCCH-MonitoringOccasion-OfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO.

A PO associated with a PF may start in the PF or after the PF.

The PDCCH monitoring occasions for a PO can span multiple radio frames. When SearchSpaceId other than 0 is configured for paging-SearchSpace, the PDCCH monitoring occasions for a PO can span multiple periods of the paging search space.

The following parameters are used for the calculation of PF and i_s mentioned above:

T: DRX cycle of the UE (T is determined by the shortest of the UE specific DRX value(s), if configured by RRC and/or an upper layer, and a default DRX value broadcast in system information. In RRC_IDLE state, if UE specific DRX is not configured by an upper layer, the default value is applied).

N: number of total paging frames in T.

Ns: number of paging occasions for a PF.

PF_offset: offset used for PF determination.

UE_ID: 5G-S-TMSI mod 1024.

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPaging-FrameOffset as defined in 3GPP TS 38.331. The parameter first-PDCCH-MonitoringOccasionOfPO is signaled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas mentioned above.

Paging Message Reception

Upon the UE receiving a paging message, the UE shall:

1> if in RRC_IDLE, for each of the PagingRecord, the UE includes the PagingRecord in the paging message:
    2> if the ue-Identity included in the PagingRecord matches the UE identity allocated by an upper layer
:

3> the UE forwards the ue-Identity and accessType to the upper layer;
1> if in RRC_INACTIVE, for each of the PagingRecord, the UE includes the PagingRecord in the Paging message:
    2> if the ue-Identity included in the PagingRecord matches the UE's stored fullI-RNTI:
       3> if the UE is configured by an upper layer with Access Identity 1:
          4> the UE initiates the RRC connection resumption procedure with resumeCause set to mps-PriorityAccess;
       3> else if the UE is configured by an upper layer with Access Identity 2:
          4> the UE initiates the RRC connection resumption procedure with resumeCause set to mcs-PriorityAccess;
       3> else if the UE is configured by upper layers with one or more Access Identities equal to 11-15:
          4> the UE initiates the RRC connection resumption procedure with resumeCause set to highPriorityAccess;
       3> else:
          4> the UE initiates the RRC connection resumption procedure with resumeCause set to mt-Access;
    2> else if the ue-Identity included in the PagingRecord matches the UE identity allocated by an upper layer:
       3> the UE forwards the ue-Identity and accessType to the upper layer;
       3> the UE performs the actions upon transitioning to RRC IDLE state with release cause 'other'.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method performed by a user equipment (UE) for monitoring a tracking reference signal (TRS), the method comprising:
receiving, from a base station (BS), a TRS configuration that indicates one or more TRS resource sets for the UE to monitor the TRS;
determining whether a Layer 1 (L1)-based availability indication configured for the one or more TRS resource sets is received from the BS, wherein the L1-based availability indication comprises a TRS availability indication that is included in a downlink control information (DCI) format 1_0 received, from the BS, with a cyclic redundancy check (CRC) scrambled by a Paging-Radio Network Temporary Identifier (P-RNTI); and
determining that the one or more TRS resource sets are unavailable in response to determining that the L1-based availability indication has not been received from the BS.

2. The method of claim 1, further comprising:
determining that the one or more TRS resource sets are available in response to determining that the L1-based availability indication has been received from the BS and the L1-based availability indication indicates a first value for the one or more TRS resource sets.

3. The method of claim 2, further comprising:
determining a time period during which the one or more TRS resource sets are available, wherein the time period comprises at least one frame that is determined based on at least a validity duration parameter and a paging cycle parameter.

4. The method of claim 3, wherein the validity duration parameter is configured by the BS via a system information block (SIB).

5. The method of claim 1, wherein the one or more TRS resource sets include a channel state information-reference signal (CSI-RS) resource.

6. The method of claim 1, wherein the L1-based availability indication includes a bitmap, each bit of the bitmap being associated with at least one corresponding TRS resource set of the one or more TRS resource sets.

7. The method of claim 1, wherein the TRS configuration is received from the BS via a system information block (SIB).

8. The method of claim 1, wherein the UE is operating in a radio resource control (RRC)_IDLE state or an RRC_INACTIVE state when determining whether the L1-based availability indication is received from the BS.

9. A user equipment (UE) for monitoring a tracking reference signal (TRS), the UE comprising:
at least one processor; and
at least one non-transitory computer-readable medium coupled to the at least one processor and storing one or more computer-executable instructions that, when executed by the at least one processor, cause the UE to:
receive, from a base station (BS), a TRS configuration that indicates one or more TRS resource sets for the UE to monitor the TRS;
determine whether a Layer 1 (L1)-based availability indication configured for the one or more TRS resource sets is received from the BS, wherein the L1-based availability indication comprises a TRS availability indication that is included in a downlink control information (DCI) format 1_0 received, from the BS, with a cyclic redundancy check (CRC) scrambled by a Paging-Radio Network Temporary Identifier (P-RNTI); and
determine that the one or more TRS resource sets are unavailable in response to determining that the L1-based availability indication has not been received from the BS.

10. The UE of claim 9, wherein the one or more computer-executable instructions, when executed by the at least one processor, further cause the UE to:
determine that the one or more TRS resource sets are available in response to determining that the L1-based availability indication has been received from the BS and the L1-based availability indication indicates a first value for the one or more TRS resource sets.

11. The UE of claim 10, wherein the one or more computer-executable instructions, when executed by the at least one processor, further cause the UE to:
determine a time period during which the one or more TRS resource sets are available, wherein the time period comprises at least one frame that is determined based on at least a validity duration parameter and a paging cycle parameter.

12. The UE of claim 11, wherein the validity duration parameter is configured by the BS via a system information block (SIB).

13. The UE of claim 9, wherein the one or more TRS resource sets include a channel state information-reference signal (CSI-RS) resource.

14. The UE of claim 9, wherein the L1-based availability indication includes a bitmap, each bit of the bitmap being associated with at least one corresponding TRS resource set of the one or more TRS resource sets.

15. The UE of claim 9, wherein the TRS configuration is received from the BS via a system information block (SIB).

16. The UE of claim 9, wherein the UE is operating in a radio resource control (RRC)_IDLE state or an RRC_INACTIVE state when determining whether the L1-based availability indication is received from the BS.

* * * * *